US009800908B2

(12) United States Patent
Bangma et al.

(10) Patent No.: US 9,800,908 B2
(45) Date of Patent: Oct. 24, 2017

(54) SYNCHRONIZED DATA PROCESSING OF BROADCAST STREAMS BETWEEN RECEIVERS, INCLUDING SYNCHRONIZED DATA PROCESSING BETWEEN A RECEIVER THAT IS IN THE PROCESS OF PROCESSING A STREAM AND A RECEIVER THAT WANTS TO JOIN THE STREAM

(71) Applicants: Koninklijke KPN N.V., The Hague (NL); Nederlandse Organisatie Voor Toegepast-Natuurwetenschappelijk Onderzoek TNO, 's-Granvenhage (NL)

(72) Inventors: Menno Bangma, The Hague (NL); Ray Van Brandenburg, The Hague (NL)

(73) Assignees: KONINKLIJKE KPN N.V., The Hague (NL); NEDERLANDSE ORGANISATIE VOOR TOEGEPAST-NATUURWETEN-SCHAPPELIJK ONDERZOEK TNO, 'S-Gravenhage (NL)

( * ) Notice: Subject to any disclaimer, the term of this patent is extended or adjusted under 35 U.S.C. 154(b) by 0 days.

(21) Appl. No.: 14/903,208

(22) PCT Filed: Jul. 8, 2014

(86) PCT No.: PCT/EP2014/064602
§ 371 (c)(1),
(2) Date: Jan. 6, 2016

(87) PCT Pub. No.: WO2015/004131
PCT Pub. Date: Jan. 15, 2015

(65) Prior Publication Data
US 2016/0156950 A1 Jun. 2, 2016

(30) Foreign Application Priority Data
Jul. 9, 2013 (EP) .................................... 13175671

(51) Int. Cl.
*H04N 21/242* (2011.01)
*H04N 21/426* (2011.01)
*H04N 21/43* (2011.01)

(52) U.S. Cl.
CPC ....... *H04N 21/242* (2013.01); *H04N 21/4263* (2013.01); *H04N 21/43* (2013.01); *H04N 21/4302* (2013.01)

(58) Field of Classification Search
CPC .. H04N 21/242; H04N 21/4263; H04N 21/43; H04N 21/4302
See application file for complete search history.

(56) References Cited

U.S. PATENT DOCUMENTS

| 8,655,156 B2 * | 2/2014 | Begen | ............... H04N 5/931 386/207 |
| 8,839,340 B2 * | 9/2014 | Van Deventer | ....... H04L 65/605 370/508 |

(Continued)

FOREIGN PATENT DOCUMENTS

| EP | 2 480 002 A2 | 7/2012 |
| EP | 2 506 570 A1 | 10/2012 |

(Continued)

OTHER PUBLICATIONS

Boronat, F., et al., "Multimedia Group and Inter-Stream Synchronization Techniques: A Comparative Study," *Information Systems*, 34:108-131 (2009).

(Continued)

*Primary Examiner* — Hoang-Vu A Nguyen-Ba
(74) *Attorney, Agent, or Firm* — Hamilton, Brook, Smith & Reynolds, P.C.

(57) ABSTRACT

In an embodiment, synchronization of data processing by a first and second receiver is enabled by the first receiver processing data units of a first broadcast stream, with a play-out delay $\Delta tp$ defining a time interval between trans- (Continued)

mission of a data unit to the first receiver and the processing of the data unit by the first receiver. Transmission of data units of a second broadcast stream is initiated to the second receiver, a common timeline correlating one or more data unit in the first stream with one or more corresponding data unit in the second stream. One or more data units is selected from stored data units corresponding to the second stream. At least part of the selected data units have corresponding data units of the first stream that have been transmitted to the first receiver but that have not been processed by the first receiver due to the play-out delay.

29 Claims, 11 Drawing Sheets

(56) References Cited

U.S. PATENT DOCUMENTS

| | | | | |
|---|---|---|---|---|
| 9,426,335 | B2* | 8/2016 | Begen | H04N 5/04 |
| 2005/0283820 | A1 | 12/2005 | Richards et al. | |
| 2008/0209021 | A1 | 8/2008 | Shamma | |
| 2009/0168760 | A1 | 7/2009 | Katis et al. | |
| 2011/0216785 | A1* | 9/2011 | Begen | H04J 3/18 |
| | | | | 370/477 |
| 2011/0217025 | A1* | 9/2011 | Begen | H04N 5/931 |
| | | | | 386/338 |
| 2012/0002111 | A1 | 1/2012 | Sandoval et al. | |
| 2012/0036277 | A1* | 2/2012 | Stokking | H04N 7/24 |
| | | | | 709/231 |
| 2013/0107786 | A1* | 5/2013 | Lotfallah | H04L 65/1016 |
| | | | | 370/312 |
| 2013/0326082 | A1* | 12/2013 | Stokking | H04L 29/06517 |
| | | | | 709/231 |
| 2014/0019635 | A1* | 1/2014 | Reznik | H04L 65/607 |
| | | | | 709/231 |
| 2014/0195651 | A1* | 7/2014 | Stockhammer | H04N 21/23439 |
| | | | | 709/219 |
| 2014/0236333 | A1* | 8/2014 | Perkuhn | H04N 21/4331 |
| | | | | 700/94 |
| 2015/0052571 | A1* | 2/2015 | Stokking | H04N 21/242 |
| | | | | 725/116 |

FOREIGN PATENT DOCUMENTS

| | | |
|---|---|---|
| EP | 2 592 842 A1 | 5/2013 |
| WO | WO 2009/102582 A1 | 8/2009 |

OTHER PUBLICATIONS

Montagud, M. and Boronat, F., "Enhanced Adaptive RTCP-based Inter-Destination Multimedia Synchronization Approach for Distributed Applications," *Computer Networks*, 56:2912-2933 (2012).

International Search Report and Written Opinion, International Application No. PCT/EP2014/064602, entitled "Synchronized Data Processing Between Receivers," Dated: Oct. 13, 2014.

Montagud, M., et al., "Event-Driven RTCP Feedback for Rapid IDMS and Latecomers' Accommodation," (Internet Engineering Task Force (IETF)—internet draft (2012).

Montagud, M., et al., "Event-Driven RTCP Feedback for Rapid IDMS and Latecomers' Accommodation," (Internet Engineering Task Force (IETF)—internet draft (2012).

Vaishnavi, et al., "From IPTV to synchronous shared experiences challenges in design: Distributed media synchronization," Signal Processing: Image Communication 26: 370-377 (2011).

Ver Steeg, B., et al., "Unicast-Based Rapid Acquisition of Multicast RTP Sessions," Internet Engineering Task Force (IETF) RFC6285—internet draft (2011).

[AVTCORE] Possible Additional Functionalities for Draft-Brandenburg-avt-rtcp-for-idms, retrieved from the internet URL: http://www.ietf.org/mail-archive/web/avt/current/msg14880.html (2011).

ETSI TS 183 063—Telecommunications and Internet Converged Services and Protocols for Advanced Networking (TISPAN): IMS-based IPTV stage 3 specification (2011).

ETSI TS 182 027—Telecommunications and Internet Converged Services and Protocols for Advanced Networking (TISPAN): IPTV Architecture; IPTV functions supported by the IMS subsystem (2011).

* cited by examiner

SYNCHRONIZED DATA PROCESSING OF BROADCAST STREAMS BETWEEN RECEIVERS, INCLUDING SYNCHRONIZED DATA PROCESSING BETWEEN A RECEIVER THAT IS IN THE PROCESS OF PROCESSING A STREAM AND A RECEIVER THAT WANTS TO JOIN THE STREAM

This application is the U.S. National Stage of International Application No. PCT/EP2014/064602, filed Jul. 8, 2014, which designates the U.S., published in English, and claims priority under 35 U.S.C. §§119 or 365(c) to European Application No. 13175671.0, filed Jul. 9, 2013.

FIELD OF THE INVENTION

The invention relates to synchronizing data processing, and, in particular, though not exclusively, to a method for enabling synchronized data processing between receivers, a client device and a synchronization server for enabling such synchronization and a computer program product for using such method.

BACKGROUND OF THE INVENTION

With the growing popularity of Internet video and Internet TV, there is an increasing need for streaming solutions that allow a shared synchronized user experience for a group of users. Such synchronized streaming services may be provided to a plurality of users, which are located at different locations. The process for achieving synchronized play-out of two or more receivers that are located at different geographical locations is usually referred to as Inter-Destination Media Synchronization (IDMS) or group synchronization.

IDMS is a synchronization technique that is distinctly different from two other known media synchronization techniques, i.e. intra-stream synchronization for managing the temporal relationship of packets within one stream, e.g. a video stream, that arrives at a receiver; and, inter-stream synchronization (sometimes also referred to as lip-sync) for managing the temporal relationship of packets in two or more related streams, e.g. a video stream and an audio stream, that arrive at a receiver.

IDMS may be used for social TV wherein different receivers at different locations receive and share a media stream (e.g. a live TV program) and wherein the users sharing the media stream may also directly communicate with each other in real-time. IDMS may be used for other purposes, such as synchronization of multiple television outputs in a single physical location, or for the synchronization of different networked speakers throughout a house. For example, a user may wish to watch the same television program on a handheld device in synchronization with a television at home, such that a user may seamlessly switch from one device to another.

Examples of known IDMS systems are described in ETSI TISPAN documents TS 182 027 and 183 063, an article by I. Vaishnavi et al. "From IPTV to shared experiences challenges in design: Distributed media synchronization" (Elsevier Signal Processing: Image Communication 26 (2011) pp. 370-377) and an article by F. Boronat et al. "Multimedia group and inter-stream synchronization techniques: A comparative study" (Elsevier Information Systems 34 (2009) 108-131).

IDMS of a broadcasted (or multicast) stream may be achieved in two steps. First the asynchrony between different receivers is determined by collecting individual status reports from synchronization clients in the receivers. Thereafter, the asynchrony between the receivers is corrected by adjusting the play-out of receivers on the basis of synchronization reports that are sent to the synchronization clients. Adjustment of the play-out may be achieved by delaying the play-out of the media stream at a receiver or transmission of the media stream at the source until the synchronization is restored.

As (live) content is often distributed on the basis of multicast or broadcast, the source is by definition not able to adjust the transmission of the media streams to the different receivers. Therefore, the receivers have to buffer the received data until the play-out time of the content at each receiver is the same. Here, the buffer in the receiver performs two functions. Firstly, buffering is performed to smooth out jitter, allow for loss-repair mechanisms (FEC, RET) and to perform video decoding, wherein packets sometimes depend on future packets. Secondly, buffering is performed for IDMS purposes in order to accommodate for the difference in reception times for different receivers.

Hence, when joining a broadcasted or multicasted stream that is synchronized on the basis of an IDMS system, a synchronization client in receiver first has to wait for data units that can be played-out out before it is able to send a status report on the play-out of the stream to a synchronization server that uses the report for calculating a delay for the joining receiver. After having received the delay information, the joining receiver may delay the play-out of the stream until it is in sync with the other receivers. Hence, the process of joining an IDMS synchronized session may seriously degrade the user experience.

In other applications, further problems may occur. For example, a live interactive classroom for distant learning may use broadcast or multicast to distribute the content and use an IDMS system to synchronize the play-out of the content, Latecomers that would like to join would have to wait for the slowest receiver before starting play-out of the synchronized session. This means that crucial information could be missed, even if the user himself has a high capacity and low-latency network connection with the interactive classroom.

In the article of Montagud et al. "Enhanced adaptive RTCP-based Inter-Destination Multimedia Synchronization approach for distributed applications", Computer Networks Journal, Vol. 56, Issue 12, pp. 2912-2933, August 2012, a method is described for initiating play-out of a media stream at the same time by a group of receiver (e.g. when starting a scheduled tele-presentation). In that case, all receivers send information about their current clocks to a source in order to calculate the initial (network) delay before the transmission of the media starts. Based on this information, the receivers may fill their buffers until the actual time for play-out has arrived.

Montagud does not address the problem of achieving a synchronized state between a receiver or a group of receivers that is in the process of playing a stream and a receiver that wants to join the streaming session in sync. Furthermore, the solution of Montagud is not suitable for applications such as a live streaming application wherein the system should be able to provide fast or even seamless realization of a synchronized state between a joining receiver and a receiver or a group of receivers that is already playing the media.

Hence, there is a need in the art for improved methods and systems for synchronized data processing between receivers, including synchronized data processing between a receiver that is in the process of processing a stream and a receiver that wants to join the stream.

SUMMARY OF THE INVENTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by a microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the users computer, as a stand-alone software package, partly on the users computer and partly on a remote computer, or entirely on the remote computer or server. In the latter scenario, the remote computer may be connected to the users computer through any type of network, including a local area network (LAN) or a wide area network (WAN), or the connection may be made to an external computer (for example, through the Internet using an Internet Service Provider).

It is an objective of the invention to reduce or eliminate at least one of the drawbacks known in the prior art. In one aspect the invention may relate to a method for selecting data units for transmission to a receiver, and preferably to a method for enabling synchronization of data processing by a first and second receiver wherein either one of said methods may comprise: said first receiver processing data units of a first broadcast stream, a play-out delay $\Delta t_p$ defining a time interval between transmission of a data unit of said first broadcast stream to said first receiver and the processing of said data unit by said first receiver; initiating transmission of data units of a second broadcast stream to said second receiver, a common timeline correlating one or more data units of said first broadcast stream with one or more corresponding data units of said second broadcast stream; and, selecting, preferably for transmission to said second receiver separate from said second broadcast stream, one or more data units from a plurality of stored data units corresponding to data units of said second broadcast stream, wherein at least part of said one or more selected data units have corresponding data units of said first broadcast stream that have been transmitted to said first receiver but that have not yet been processed by said first receiver due to said play-out delay.

Here, the data processing or processing of data units may generally refer to any processing step in the receiver that is needed for transforming data units in to a signal for display (including but not limiting to receiving, buffering (de)packetizing, decoding, decrypting and/or play-out of the data units). The synchronization may be based on a particular type of data unit processing that occurs in two or more receivers.

The data units in the first broadcast stream may experience a play-out delay (an end-to-end delay) that causes a time-interval between the start of transmission of the data units by the media source and the actual processing of these data units by the first receiver. The data units in the first and second stream share a common timeline so that there is a temporal relation (correlation) between the processing of a data unit in the first stream by the first receiver and the processing of an associated data unit in the second stream by the second receiver. Data units in both streams that correspond to the same position on this common time line are corresponding data units.

Typically, but not necessarily, the first and the second broadcast stream relate to the same broadcast or multicast (these terms may be used interchangeably for the purpose of the invention). Hence in such a scenario, a data unit transmitted by a media source will be made available as part of a first broadcast stream to a first receiver at the same time as it is made available as part of a second broadcast stream to a second receiver. So whenever the second receiver requests a broadcast (multicast), e.g. intends to join the second broadcast stream, the first data unit the second receiver is able to receive is the first data unit that is scheduled to be transmitted (but has not yet been transmitted) as part of the first respective second broadcast stream. So this data unit that is about to be transmitted, is the first data unit that the second receiver is capable of receiving. If the invention as claimed is not used, this would thus theoretically be the first data unit that could be processed (e.g. played-out) at the second receiver in a synchronized fashion with a corresponding data unit being processed (e.g. played-out) at the first receiver.

As a consequence, if the invention as claimed is not used, the earliest moment in-time (the minimum theoretical delay) before a synchronized processing (e.g. play-out) of the content received in the first and second broadcast stream can be achieved, is the time it takes (e.g. the play-out delay) between the transmission of this data unit (scheduled for transmission) as part of the broadcast (e.g. the first broadcast stream) and the moment it is ready for processing (e.g. play-out) by the first receiver. A shorter delay for achieving synchronization cannot be accomplished if no additional measures are taken.

Thus a minimum effect of the invention as claimed would be achieved if this minimum theoretical delay could be shortened. This minimum effect could be achieved if synchronization could be already accomplished with a data unit that is one earlier in the order of processing by the first receiver. The one data unit that is earlier in processing would in this scenario correspond to the last one transmitted in the broadcast to the first receiver at the moment the second broadcast stream is requested (by the second receiver). Because the corresponding data unit in the second broadcast stream has also just been sent (assuming both broadcast streams relate to the same broadcast), it can no longer be received as part of the second broadcast stream by the second receiver.

Therefore, according to the invention, a data unit corresponding to this 'last transmitted' data unit in the second broadcast stream is selected from a location where this data unit is stored. This smart selection of a data unit for transmission separately from the second broadcast stream, enables 'earlier' synchronization than what is possible had only the second broadcast stream be provided to the second receiver.

For making this smart selection in a 'de minimis' scenario, no further information about the processing point of the first receiver is needed. However the invention as claimed also teaches a boundary where the smart selection of data units could reach its theoretical maximum effect. This boundary is best described as the scenario wherein a data unit is selected that has a corresponding data unit (one with the same position of the common timeline) that has not yet been (but is the next-in line to be) processed (played-out) by the first receiver. This theoretical boundary assumes that such selected data unit could be transmitted fast enough so that it is ready for processing by the second receiver in synchronization with the processing of the corresponding data unit at the first receiver.

This theoretical boundary thus defines the data unit to be selected for achieving a maximum decrease in synchronization delay.

In summary the invention is based on selecting from a range of data units wherein the boundaries are associated with the theoretical minimum and maximum effects to be achieved. It is clear to the skilled person that the more the selection of data units according to the invention is aimed at achieving a greater effect, additional measures according to aspects of the invention may be needed. This is because the room for margin becomes smaller when earlier data units (selected data units corresponding to data units being broadcast earlier in time) are selected. E.g. there is less time left for getting these data units transmitted to the second receiver and ready for processing by the second receiver in sync with the processing of corresponding data units by the first receiver. The additional measures become readily apparent when reading the specification. These may for example including the use of processing point information of the first receiver in the selection, which better defines how much margin is available in the selection. These measures may also include using expected or measured play-out delays at the first and second receiver, to be able to make more precise estimates of the margin. And furthermore fast channel change methods (bursting) may be used for transmitting the selected data units at enhanced speed (e.g. a speed greater than the first or second broadcast stream) to the second receiver.

The relation between data units of the first and second stream may be used to select data units corresponding to data units of the second stream that are stored in a memory. The selected data units may be transmitted (in a burst) to the second receiver which may use these transmitted selected (burst) data units to reduce the time that is needed for the second receiver to join a stream in synchronization with one or more further receivers.

Data units corresponding to data units of the second stream may be provided or (temporally) stored (e.g. buffered or cached) in the network in a memory or data storage medium of a synchronization server or a cache server. Data units in the second stream may comprise the same or similar content as data units in the first stream or data units in the first and second stream may carry the content in different formats e.g. HD and SD. Alternatively, the content in the second stream may be associated with the content in the first stream in the sense that the second stream comprises content that is configured to be played out in synchronization with the first stream wherein the content provides an enhancement or additional information or content for the first (main) stream. For example, the second stream may comprise information associated with the content in the first stream, e.g. a different camera angle, additional commentaries, etc.

In an embodiment, the method may comprise transmitting, preferably unicasting, at least one of said one or more selected data units to said second receiver before said corresponding data units of said first broadcast stream have been processed by said first receiver.

In an embodiment, unicasting may be used for transmitting the selected data to the second receiver. The selected data units of the second stream are provided to the second receiver before their corresponding data units in the first stream are processed so that the second receiver is able to process at least part of these data units substantially in sync with the first receiver.

In an embodiment, said transmitting may start with a selected data unit that has no processing dependency on one or more data units preceding in processing order said selected data unit. In an embodiment, said selected data unit may be a (MPEG) I-frame or an equivalent thereof.

In this embodiment, the unicast transmission is initiated by a first data unit that can be independently decoded and decrypted by the second receiver.

In an embodiment, the method may further comprise terminating said transmitting of at least one of said one or more selected data units when said second receiver has received one or more data units of said second broadcast stream. Hence, in this embodiment, the unicast transmission of selected data units is terminated once the second receivers starts receiving data units of the requested second broadcast stream.

In an embodiment, said method may comprise providing said second receiver with a processing point of said first receiver. This way, the second receiver keeps track of the processing of data units of the first stream by the first receiver. In an embodiment said second receiver may use said processing point for processing at least one of said one or more transmitted selected data units in synchronization with the processing of a corresponding data unit of said first broadcast stream by said first receiver. This way, the second receiver may determine at which point in time a selected data unit can be processed by the second receiver in synchronization with the processing of a data unit by the first receiver, whereby the selected data unit and the data unit of the first receiver relate to the same position on a common timeline. The processing point may be for example a play-out time (rendering-time), but could also be a reception time or decoding time or any other processing time point at a receiver. In such embodiments, it is assumed that local clocks at the first respective second receiver are synchronized, or that the clock-offset between the two receivers is known. Alternatively the processing point is provided by the first receiver to the second receiver with a known delay after receipt of the data unit it corresponds to. In that case the second receiver time-stamps the receipt of the processing point, substracts the known delay and thus determines an estimate of an arrival time of a data unit (e.g. a processing point) at the first receiver, without using the time-stamp provided by the first receiver as part of the processing point (i.e. processing point information). In this embodiment clock-synchronization or knowledge of the clock offset is not needed.

In an embodiment, said processing point may comprise a reference data unit identifier and a clock time associated with the processing (said clock time preferably defining a processing time) of said reference data unit. The reference data unit may be associated with a data unit that is processed by the first receiver when the second receiver requested data units of a second broadcast stream from a content source. This reference data unit may be used for determining a corresponding data unit of the second stream that is stored in a memory and that may be used as a start data unit for transmitting a sequence of data units to the second receiver.

In an embodiment, the method may comprise using said processing point (also referred to as processing point information/parameters) to determine a first content timeline associated with the processing of data units of said first broadcast stream by said first receiver; and, processing at least part of said one or more selected data units in accordance with a second content timeline in which data units are processed faster than said first content timeline. In another embodiment, the method may comprise: said second receiver using a second processing rate for processing at least one of said one or more transmitted selected data units, wherein said second processing rate is higher than a first processing rate that is used by said first receiver; determining if the processing of said at least one transmitted selected data unit by said second receiver coincides with the processing of a corresponding data unit of said first stream by said first receiver; and, optionally, said second receiver starting processing subsequently transmitted selected data units using said first processing rate, if said at least one transmitted selected data unit coincides with the processing of a corresponding data unit. In this embodiment, the second receiver may start processing (decrypting and decoding) at a rate that is faster than the rate used by the first receiver. This way the second receiver may rapidly catch up with the processing of the first receiver. The receivers are in sync the moment the second content timeline coincides (crosses) the first content timeline. At that moment, the second receiver may start processing data units in accordance with the content timeline of the first receiver.

In an embodiment, at least one of said one or more selected data units may be transmitted at a transmission rate that is higher than the first processing rate at which said first receiver processes data units in said first broadcast stream. Fast transmission of the selected data units to the second receivers allows further reduction of the time that is needed for the receivers to process data units in synchronization.

In an embodiment wherein an initial data unit $y_{i\ may}$ define a first data unit of said second broadcast stream that is transmitted to said second receiver, and wherein said selecting may comprise: selecting a start data unit for starting an unicast transmission to said second receiver, wherein said start data is selected from a sequence of said stored data units, said sequence being determined on the basis of said initial data unit $y_i$ and the N-th data unit $y_{i-N}$ preceding in processing order said initial data unit $y_i$, $N=R_2*(\Delta t_p - \Delta t_R)$ defining the number of data units N that can be unicasted to the second receiver wherein $\Delta t_R$ represents the burst delay; and $R_2$ the transmission rate at which data units are unicasted to said second receiver. By purposive selection of the data unit for starting the unicast (stream) to the second receiver, the amount of data units that are transmitted may be reduced.

In a further embodiment, the method may comprise: a media source initiating said transmission of data units of a second broadcast stream in response to a request for data units by said second receiver; and, a synchronization server selecting said one or more data units from a plurality of stored data units corresponding to said second stream; and, optionally, providing said second receiver with a processing point of said first receiver. In this embodiment, the process may start with a second receiver requesting data units in a stream, which triggers both a broadcast transmission of data units in a second broadcast stream to the second receiver and a unicast transmission of data units to the second receiver. The unicasted data units are data units "back in time" so that these data units can be used by the second receiver in order reduce the time that is needed for achieving synchronized processing of data units by the first and second receiver.

In an embodiment, the selected data units have no decoding dependency on other data units, e.g. (MPEG) P-frames, may be discarded from transmission to the receiver. This way the amount of data units that are transmitted to the second receiver may be reduced.

In an embodiment, a data unit in the first and second may be associated with information for determining a position on the content timeline, preferably said information including at least one of: an RTP timestamp, MPEG2-TS Presentation Time Stamp (PTS), MPEG2 Decoding Time Stamp (DTS), DVB Timeline Packets, RTSP SMPTE time code and/or RTSP normal play time or equivalents thereof.

In an embodiment, said first receiver may be part of a group of receivers that are synchronized by a synchronization server, wherein said method may further comprise: said synchronization server determining a reference point on said presentation timeline of said group of synchronized receivers, and, said synchronization server determining said play-out delay. The invention thus enables a user of a receiver to start watching (almost) immediately upon joining an IDMS-synchronized streaming session, while the network may still use a single point-to-multipoint, streaming, media source for efficiency purposes.

In a further aspect, the invention may relate to a client device, preferably for use in a receiver, wherein said client device enables synchronizing data processing with the data processing of a further receiver, said data processing preferably comprising the play-out of data received by said receiver and/or said further receiver; wherein said client device may be configured for: receiving a processing point associated with the processing of a data unit of a first broadcast stream by said further receiver, a play-out delay $\Delta t_p$ defining the time interval between transmission of a data unit of said first broadcast stream and the processing of the same data unit by said further receiver; receiving one or more unicasted data units corresponding to data units of a second broadcast stream, wherein a common timeline correlates one or more data units of said first broadcast stream with one or more corresponding data units of said second broadcast stream and wherein said one or more unicasted data units correspond to one or more data units of said first broadcast stream that have been transmitted to said first receiver but have not yet been processed by said first receiver due to said play-out delay; and, using said processing point for processing at least part of said one or more unicasted data units in synchronization with the processing of said one or more corresponding data units of said first broadcast stream by said first receiver.

In an embodiment, said client device may be further configured for: receiving one or more data units of said second broadcast stream; terminating the processing of said one or more unicasted data units; and, continuing the processing of data units in synchronization with the processing of data units of said first stream by said first receiver on the basis of the one or more data units of said second broadcast stream.

In an embodiment, said client device may be further configured for: using said processing point to determine a first content timeline associated with the processing of data units of said first broadcast stream by said first receiver; processing at least part of said one or more unicasted data units in accordance with a second content timeline in which data units are processed faster than said first content timeline. In another embodiment, said client device may be further configured for: using a second processing rate for processing at least one of said one or more transmitted selected data units, wherein said second processing rate is higher than a first processing rate that is used by said first receiver; determining if the processing of said at least one transmitted selected data unit by said second receiver coincides with the processing of a corresponding data unit of said first stream by said first receiver; and, optionally, said second receiver starting processing subsequent transmitted selected data units using said first processing rate, if said at least one transmitted selected data unit coincides with the processing of a corresponding data unit.

In an embodiment, said client device may be further configured for: selecting one or more data units from a plurality of stored data units corresponding to data units of said second broadcast stream, wherein at least part of said selected data units have further corresponding data units of said first broadcast stream that have been transmitted to said first receiver but have not yet been processed by said first receiver due to said play-out delay.

In a further aspect, the invention may relate to a server for enabling synchronization of data processing by a first and second receiver, preferably said server being configured for use with one or more client devices as described above, wherein said server may be configured for: providing, preferably storing of buffering, a plurality of data units corresponding to data units of said second broadcast stream in a memory or on a storage medium; selecting one or more data units from a plurality of said stored data units, wherein a common timeline correlates one or more data units of said second broadcast stream with one or more corresponding data units of said first broadcast stream and wherein said one or more selected data units correspond to one or more data units of said first broadcast stream that have been transmitted to said first receiver but have not yet been processed by said first receiver due to said play-out delay; transmitting, preferably unicasting, at least one of said one or more selected data units to said second receiver before at least one of said one or more corresponding data units of said first broadcast stream have been processed by said first receiver.

The invention may also relate to a program product, a computer program product comprising software code portions configured for, when run in the memory of a computer, executing the method steps as described above. The invention will be further illustrated with reference to the attached drawings, which schematically will show embodiments according to the invention. It will be understood that the invention is not in any way restricted to these specific embodiments. For example, although the invention has been described in terms of a first and a second broadcast stream being received by a first and second receiver respectively, the invention could be also useful if the first and second broadcast stream are received by the same receiver (e.g. client device).

DETAILED DESCRIPTION

Figure 10:
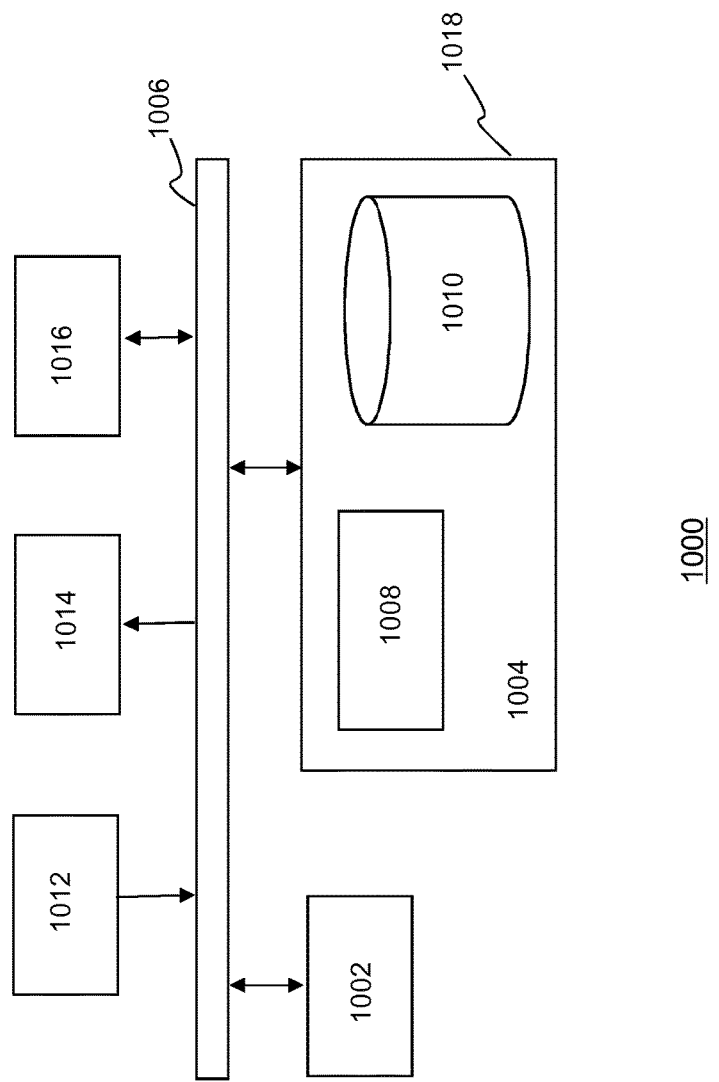
FIG. 10 depicts a data processing system for use in embodiments of the invention.

For the purpose of this invention the term receiver refers to a computer arranged for receiving a digitalized data stream. Examples of a receiver are home gateways, mobile terminals such as smartphones, television sets, tablets, laptops, set top boxes, wearables (e.g. Google Glass) and so on. The term client device generally refers to a module comprising the functionality for executing one or more parts of the method according to one or more embodiments of the invention. The module is suitable for use in a receiver (system). As such, and when independently claimed, the client device relates to a hardware component for use in a receiver, or to the receiver itself. Examples of such a hardware component may be a System on a Chip (SoC), a Radio Card, a Printed Circuit Board, or an Integrated Circuit. Likewise the functions and capabilities of the client device may also be implemented on a receiver as software or a combination of software and hardware components. The terms client and client device are used interchangeably throughout this application. FIG. 10 provides an example of a data processing system which may be used in a method according to embodiments of the invention. The data processing system of FIG. 10 may be arranged as a receiver or server or client device according to embodiments of the invention.

Figure 1A:
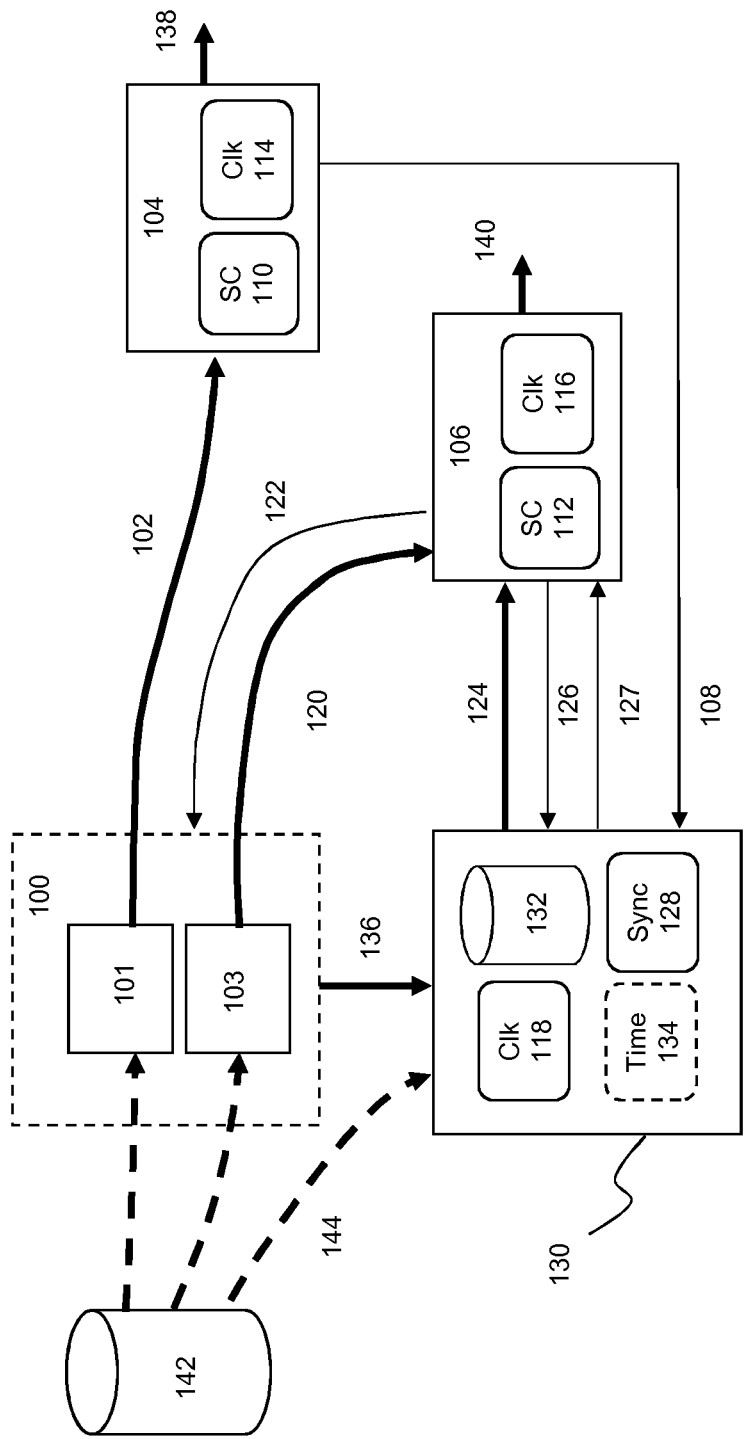
FIG. 1A depicts a system for synchronizing the processing of data units between receivers according to an embodiment of the invention.

FIG. 1A depicts a system for synchronizing the processing of data units by different receivers according to one embodiment of the invention. In particular, FIG. 1A depicts a system for synchronization the processing of data units that are transmitted by a media source 100 (for example a media storage device such as a media server) to receivers 104,106. Here, the term processing data units may generally refer to any processing step in the receiver that is needed for transforming data units in to a signal for display (including but not limiting to receiving, buffering (de)packetizing, decoding, decrypting and/or play-out of the data units). The synchronization may be based on a particular type of data unit processing that occurs in two or more receiver.

In order to provide a scalable media distribution solution, the media source may packetize content in data units and transmit data units to the receivers using a suitable broadcasting technique. The term 'broadcasting', as used in the invention, may include any suitable point-to-multipoint distribution technique, including broadcasting, (application layer) multicasting, webcasting, simulcasting and/or anycasting. For the purpose of this invention, the term "a broadcast(ed) stream" refers to any stream that is based on suitable point-to-multipoint distribution technique. Or to put it in other words: any (content) stream that is generated as a result from using a point-to-multipoint distribution technique for streaming content. In some embodiments, when using such a point-to-multipoint distribution technique, such broadcast stream may originate as one stream at its origin (media source), but may branch further downstream, such that the term "broadcast(ed) stream" may also refer to one out of a plurality of streams being received by a plurality of endpoints (destinations), whereby the plurality of streams all relate to the same 'broadcast' (e.g. to the same point-to-multipoint distribution event).

In some embodiments throughout this application, the terms "broadcast(ed/ing)" and "multicast(ed/ing)" are used next to each other (e.g. 'a broadcast stream or a multicast stream'). In those cases the narrow interpretation of the term broadcast stream may be applicable. E.g. a stream that is based on/originates from a broadcast(transmission) to all nodes/endpoints of a network as opposed to a transmission to only a group of nodes/endpoints (multicasting). In the narrow interpretation, the terms multicast and broadcast are used as mere examples (species) of streams/events that are based on/generated as a result of/originating from content distribution using any type of suitable point-to-multipoint distribution technique, collectively referred to under its generic name, for the purpose of this invention, as 'broadcasting' (genus). The skilled person will readily recognize that these terms may for the purpose of the invention be substituted by any stream that is based on any suitable point-to-multipoint distribution technique.

The skilled person will also recognize that the broader (genus) interpretation of the term(s) 'broadcast(ed/ing)' is/are applicable, whenever these terms are used in the claims, unless specified otherwise. Data transmission to the receivers may be implemented on the basis of one or more transport and/or streaming protocols, e.g. MPEG-2, RTP, DVB and/or an adaptive streaming protocol such as HLS or MPEG-DASH wherein a data unit may comprise a content payload, e.g. (part of) one or more video frames and/or audio samples, for play-out by the receivers. The format of a data unit, a data container for a payload, may depend on the protocol(s) that is (are) used for transmitting the data units to the receivers. The media source may comprise one or more media servers 103,103, which may be part of media distribution system, e.g. IPTV system or a content distribution network (CDN). The media source may receive the content from media storage 142 in the network.

A first receiver may receive data units of a first broadcast stream 102 and processes the data units in order to play-out 138 the payload of the data units on a display. If a receiver, e.g. a second receiver 106, would like to receive the same content or content related to the content received by the first receiver, the second receiver may send a media request 122 to the media source in order to set up a broadcast session between the source and the receiver. Thereafter, data units of a second broadcast stream 120 may be transmitted to the second receiver. The media request may generally encompass any type of request for receiving a broadcast stream. For example, in an embodiment, the media request may refer to joining a multicast session. In another embodiment, the media request may refer to tuning into a predetermined DVB stream. In yet another embodiment, instead of a media request from a receiver, a network element may request (initiate or "push") transmission of a stream to the second receiver.

Data units in a stream may be associated with meta-data that is used by the receivers to process the data units (e.g. a video frame and/or audio sample) in the correct time order. The meta-data may be inserted in the header of a data unit or in dedicated data units in the broadcast stream. Alternatively and/or in addition, meta-data associated with the broadcast stream may be transmitted in a separate stream to a receiver. The meta-data may comprise a sequence of linearly increasing (unique) values, which may be used to identify a data unit (a data unit identifier) and to identify the order in which data units are processed by a receiver in time, e.g. a synchronized wall clock time. The data units (identified by data unit identifiers) that are to be processed in a predetermined time order may form a content timeline. The content timeline thus represents the order of processing of a predetermined sequence of data units on a timeline (e.g. wherein each data unit is associated with a position on the timeline).

In case the processing of a data unit refers to play-out (presentation) of a data unit, the content (processing) timeline may also be referred to as the content presentation timeline. Instead of content timeline, also the terms common content timeline or just common timeline are used throughout this application. As the skilled person will understand these terms relate to the same teaching and may be interchanged. The term 'common' is used to indicate that the timeline may relate to more than one stream that share the same content timeline. It should be noted that the same common timeline may have different 'scaling' (e.g. more than one scale) for different streams. For example the RTP offset in one stream may be different than another stream, thus the same RTP timestamp in different streams may relate to different positions on the common content time line. Likewise different formats of data units in different streams may relate to different scaling, thus more than one scale may apply to the same common content time-line. As an alternative, if the correlation between data units in different streams, but representing the same position, is known a priori, a conversion may be applied from one data unit identifier in one stream to a data unit identifier in the other stream, and one scale is sufficient. It should be noted that a content timeline according to the invention inherently has a scale present, for otherwise it would have no meaning or use. This could be as simple as defining a (e.g. starting) position [the data unit identifier of a (e.g. the first) position) on the content timeline] and an indication how the identifier change in time. Alternatively an identifier associated with a first position on the time-line (the position being either in relative time terms, e.g. half way or at 50% of completion, or an absolute position at for instance t=30 minutes) and a second position is indicated. Other variants or combinations not excluded.

Examples of data unit identifiers include: RTP timestamps associated with (part of) a frame, data, and/or audio sample, presentation or decoding timestamps used in MPEG2-TS format (e.g. PTS or DTS), a play-back position (e.g. SMPTE time code or normal play time) used in Real Time Streaming Protocol (RTSP, see IETF RFC 2326), or one or more equivalent protocol parameters in or associated with data units in the stream.

The media source may broadcast multiple instances of a media stream to receivers. Different instances of the media stream may refer to different video qualities (SD, HD, etc.), different codecs (H.262, VP.8, etc.) and/or different transport protocols (DVB, MPEG-DASH, etc.). For example, the source may transmit a live broadcast stream in for example DVB-IPTV or DVB-C or DVB-T or DVB-S format as a first instance of a media stream (a first broadcast stream 102) to the first receiver 104 and the same live broadcast stream in MPEG-DASH format for mobile multimedia devices as a second instance of the media stream to the second receiver 106.

Alternatively, the media source may broadcast a (main) media stream to the first receiver and one or more associated media streams to a second receiver (e.g. a second screen application). For example, the first stream may be a live video broadcast which a user may watch on a television screen (the main screen) and the second stream may be a broadcast comprising alternative and/or additional content (e.g. as unseen moments, alternative information, soundtrack, and different viewing angle) that a user may watch on another device, e.g. an electronic tablet (the second stream) in synchronization with the play-out of the first screen).

In the above situations, the media streams may be configured to be played-out in sync by the different receivers, wherein a common timeline correlates the processing of data units in a first broadcast stream with one or more corresponding data unit in a second broadcast stream. Hence, if the broadcast streams are played-out according to the common timeline, synchronized play-out is achieved.

When transmitting data units of the first broadcast stream to the first receiver, an end-to-end delay causes a time-interval between the start of transmission of the data units by the media source and the actual processing of these data units by the first receiver. This end-to-end delay (also referred to as the play-out delay) may be the result of different types of delays, including network delays caused by delay sources in the network (e.g. unexpected jitter, congestion, packet-loss) and by delays caused by the processing of the data units by the receiver (e.g. buffering, depacketizing, decrypting and/or decoding data units by a media engine in a receiver).

Hence, when the second receiver (requesting or joining a second stream) would like to process data units of the second stream in synchronization with the first receiver, the second receiver will have to delay the play-out of the data units for a time period before the data units may be played-out in sync with the play-out of the first receiver. The play-out delay may considerably degrade the user experience as they may be of the order of seconds up to more than ten seconds.

In order to counter this problem, the system in FIG. 1A comprises a synchronization server 130 (also referred to as a rapid synchronization acquisition server RSAS). The synchronization server may be associated with a memory 132 (e.g. a cache, a buffer or another storage medium) that (temporarily) stores at least part of the data units that are broadcasted by the media source.

The memory associated with the synchronization server may be configured to receive data units of the second stream from the media source in a broadcast or unicast stream. In another embodiments, the memory may receive data units of the second stream directly from the media storage 142 or another media source in the network. Preferably, the communication channel 136,144 between the synchronization server and the media source is a low-delay communication channel 136. In this application, a low-delay communication channel may be defined as a communication channel between a transmitter and a receiver that has a transmission time, which is substantially smaller than the desired level of synchronization. For example, when a (low) level of synchronization is desired (asynchronies between 500-2000 ms), a low-delay communication channel of a transmission time of less than 500 ms is sufficient.

Further, the synchronization server may be configured to receive timing information 108 from synchronization clients 110,112 in the receivers. Timing information may define a processing point, i.e. a point on the content timeline associated with the processing of data unit by a receiver. Timing information may comprise a data unit identifier and a wall-clock associated with the processing of the data unit identified by the data unit identifier. In case the wall-clock represents the play-out of the data unit, the wall-clock time may be referred to as a presentation time (play-out time) of the data unit. In an embodiment, timing information may be sent as part of a special data structure, e.g. an IDMS report, to the synchronization server.

The data unit identifier in the timing information may identify the position of a data unit, e.g. (part of a) frame and/or audio sample, on the content presentation timeline of a receiver. The clock time in the timing information may indicate the time at which the data unit identified by said data unit identifier was processed by a receiver.

In some embodiments, the synchronization server may comprise a wall-clock 118 that is in sync with the wall-clocks 114,116 of the receivers. The wall-clocks of the receivers and the RSAS may be synchronized using a suitable protocol, e.g. the NTP protocol. A synchronization function 128 may use the timing information of a receiver, its wall-clock and the transmission rate used by the media source to transmit data units to the receivers in order to determine the content timeline of that receiver or—in case the receiver is part of a set of (IDMS) synchronized receivers—the content timeline of the IDMS session. The synchronization function may be centrally implemented in the synchronization server, the client or a separate network element. Alternatively, the synchronization function may be implemented in a distributed way, wherein parts of the sync function are implemented in a separate network element and/or the synchronization client in the receiver.

As will be described hereunder in more detail, the synchronization server may use the stored data units in the memory in order to rapidly synchronize the play-out of a second receiver that is joining a broadcast with the play-out of a first receiver that is already playing the broadcast. For example, when the second receiver in FIG. 1A requests data units of a second broadcast stream 120, a synch acquisition request message 126 from the synchronization client to the synchronization server may trigger the selection of a predetermined sequence of (time-ordered) data units 124 that are stored in the memory.

These selected data units in the memory may be associated with data units that are already broadcasted by the content source and not yet played-out by the first receiver due to the play-out delay. The synchronization server or a cache server associated with the synchronization server may deliver, e.g. unicast, at least part of the selected data units to the second receiver, which may be used by the second receiver to start processing data units in sync with the first receiver. The second receiver may use timing information 127 associated with a processing point of a predetermined data unit by the first receiver in order to process the unicasted data units in synchronization. The synchronization server may send the timing information to the second receiver.

Figure 1B:
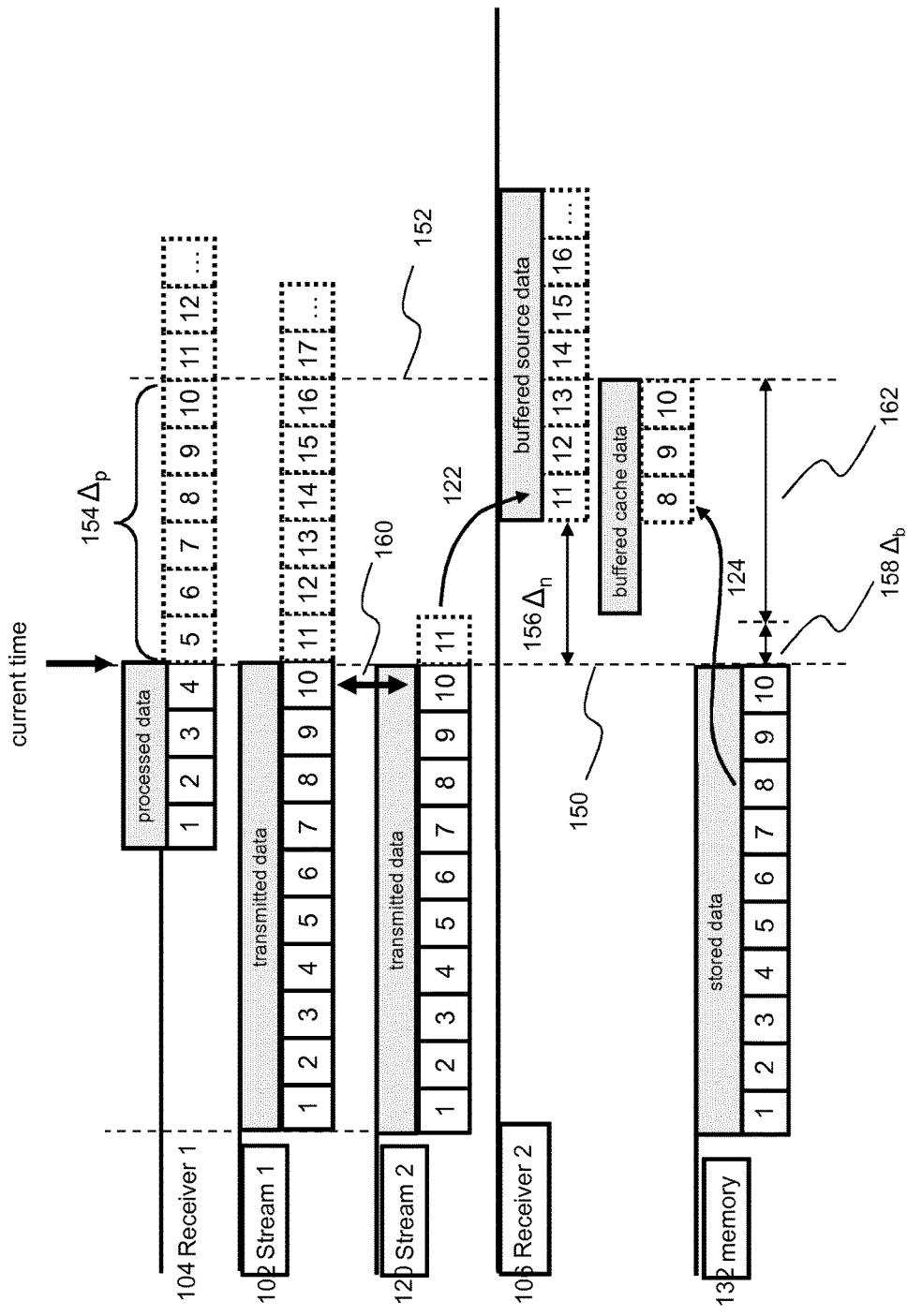
FIG. 1B schematically depicts the processing of data units as a function of time in a system according to an embodiment of the invention.

FIG. 1B schematically depicts the processing of data units as a function of time in a system as described with reference to FIG. 1A according to an embodiment of the invention. At the current wall-clock time $t_o$ (denoted by the dotted line 150), the first receiver 104 is in the process of receiving and processing data units of a first broadcast stream 102 that originates from a media source (not shown). Delays in the network and buffering- and decoding delays at the first receiver cause a play-out delay $\Delta t_p$ 154 between a data unit being transmitted by the content source to the first receiver and the data unit being processed by the first receiver. During the processing delay $N=R_1*\Delta t_p$ data units may be broadcasted to the first receiver, wherein $R_1$ is the rate at which the data units are transmitted to the first receiver. Hence, at a current wall-clock time $t_o$ a data unit $x_i$ may be processed by the first receiver and data unit $x_{i+N}$ may be transmitted by the content source to the receiver. In the example of FIG. 1B, data unit $x_5$ is about to be processed (played-out) by the first receiver when data unit $x_{11}$ is about to be broadcasted to the first receiver. Due to this play-out delay, at current time $t_o$ only data units $x_1$-$x_4$ of the transmitted data units $x_1$-$x_{10}$ have been played-out by the first receiver.

FIG. 1B further shows that at current time $t_o$, a media source may be triggered to start the transmission of data units of a second broadcast stream 120 to the second receiver 106. As already discussed with reference to FIG. 1A, the first and second broadcast stream may relate to a first and second instance of a broadcast stream. Alternatively, the data units in the second stream may be associated with data units in the sense that it comprises information that is designed to be played-out in sync with the main stream (e.g. payload associated with a second screen application, subtitles and/or additional information for play-out in sync with the content in the first stream). Both streams share a common timeline 160 that provides a temporal relation between data units in the first and second stream.

When data units in the second broadcast stream are transmitted to the second receiver, a network delay $\Delta_n$ 156 between a data unit being broadcasted to the second receiver and the data unit being received by the second receiver will be present. In this example, the network delay $\Delta_n$ may be smaller than the play-out delay associated with the first receiver. Hence, although the second receiver will start receiving data units of the second broadcast stream, e.g. data unit $y_{11}$ and further, it will have to delay the playout of these data units before they can be processed in sync with data units in the first stream. For example, in FIG. 1B data unit $y_{11}$ in the second broadcast stream will be received at $t_o+\Delta_n$ by the second receiver. Therefore playout of the second receiver needs to be delayed until the clock time has been reached $t_o+\Delta tp$ (as denoted by dotted line 152) in order to process the data unit $y_{11}$ of the second stream in sync with the associated data unit $x_{11}$ in the first stream.

The initial play-out delay of the second receiver may be reduced by supplying a predetermined set of data units of the second stream to the second receiver. These data units may be selected from a plurality of data units that are stored in a memory 132, e.g. a cache, a buffer or any other suitable data storage medium. By selecting stored data units that have corresponding data units in said first stream that were transmitted to said first receiver but not yet processed by said first receiver due to said play-out delay and transmitting at least part of these selected data units to the second receiver, faster synchronized processing between the first and second receiver may be achieved.

The selected data units may include one or more data units that precede the first data unit $y_{11}$ that was (or is about to be) broadcasted to the second receiver at a current time $t_o$ by the source, e.g.: $y_{10}$ or $y_9,y_{10}$ or $y_8$, $y_9$, $y_{10}$ or $y_5, \ldots, y_8, y_9, y_{10}$. Data units earlier than $y_5$ are associated with data units of the first stream that are already played-out by the first receiver and thus cannot be used in order to reduce the play-out delay.

FIG. 1B show that a time window $\Delta t_p$-$\Delta_n$ 162 is available for transmitting stored data units to the second receiver. The number of data units that can be unicasted to the second receiver depends on the unicast data unit transmission rate $R_2$ and the time $\Delta t_R$ 158 that is needed to for the cache server to unicast a data unit to the second receiver. Within the time window $\Delta t_p$-$\Delta t_R$, a maximum of $N=R_2*(\Delta t_p-\Delta t_R)$ data units may be unicasted to the second receiver wherein $R_2$ is the rate that is used for unicasting the data units to the second receiver. In case $\Delta t_p \gg \Delta t_R$, N approximates $R_2*\Delta t_p$ data units. Hence, given a data unit transmission rate $R_2$, the data unit for starting a unicast to the second receiver may be selected from a predetermined set of stored data units wherein $y_{i-N}, \ldots y_{i-2}, y_{i-1}$ wherein $y_i$ is the first data unit that is broadcasted by the source to the second receiver.

In an embodiment, the synchronization server may unicast the data units at a rate $R_2$ that is higher than the rate $R_1$ that is used by the media source to transmit data units of first stream to the first receiver. This way, the second receiver may rapidly "catch-up" with the play-out of the first receiver. The data units that are sent to the second receiver at a high rate may be referred to as a "burst". In this application, a data unit that is transmitted in a burst to a receiver may be referred to as a burst data unit.

The burst may provide the second receiver with data units of the second stream that are positioned at earlier points in time on the content timeline of the first receiver than the data units that leave the output of the media source at the moment the second receiver requested the second stream from the media source. On the basis of the sequence of data units from the synchronization server, the second receiver may already start its play-out, while it is still waiting for data units from the media source 100. Once data units from the media source are received, the receiver may switch over to the play-out of these data units.

In an embodiment, the synchronization function may be configured to determine (or at least estimate) the play-out delay $\Delta t_p$ between the media source and the first receiver. To that end, the synchronization server may (continuously) buffer data units of the first stream in its memory and timestamp the data units upon reception using its synchronized wall-clock. When the synchronization server is triggered to send a burst to the second receiver, it may determine a first (NTP) time associated with the wall-clock time of a data unit (e.g. a video frame associated with an RTP timestamp), that is played-out by the first receiver. The wall-clock time defines the processing time (for example the play-out time) of the data unit. The data unit in the example is identified by a RTP timestamp which indicates the position of the data unit on the content (processing) timeline. Further, the synchronization server may thus use this RTP timestamp to find the same video frame associated with a second (NTP) time in the memory of the RSAS. The same video frame is defined as the data unit in the content that is associated with the same position on the content (processing) timeline. Since the communication channel between the RSAS and the media source is a low-delay channel, the play-out delay may be determined as the difference between the first (NTP) time and second (NTP) time.

In order to trigger the transmission of a burst, the synchronization client in the second receiver may send a sync acquisition request 126 to the RSAS. In an embodiment, the sync acquisition request may comprise a wall-clock time indicating the time that the request was sent to the synchronization server and/or the time the media request was sent to the media source. Alternatively, the sync acquisition request may be associated with a wall-clock time indicating the reception of the sync request by the RSAS. The synchronization function 128 in the RSAS may use the wall-clock time associated with the sync acquisition request in order to determine a reference time on the content timeline.

Hence, the system of FIGS. 1A and 1B may allow reduction of the play-out delay and fast synchronization of data processing by a receiver requesting a stream with data processing of one or more receivers that are already in the process of processing the stream. The details associated with the process of selecting data units for transmission to the second receiver, transmitting the selected data units (in a burst) to the second receiver and the processing the unicasted data units by the second receiver will be described hereunder in more detail.

Figure 2:
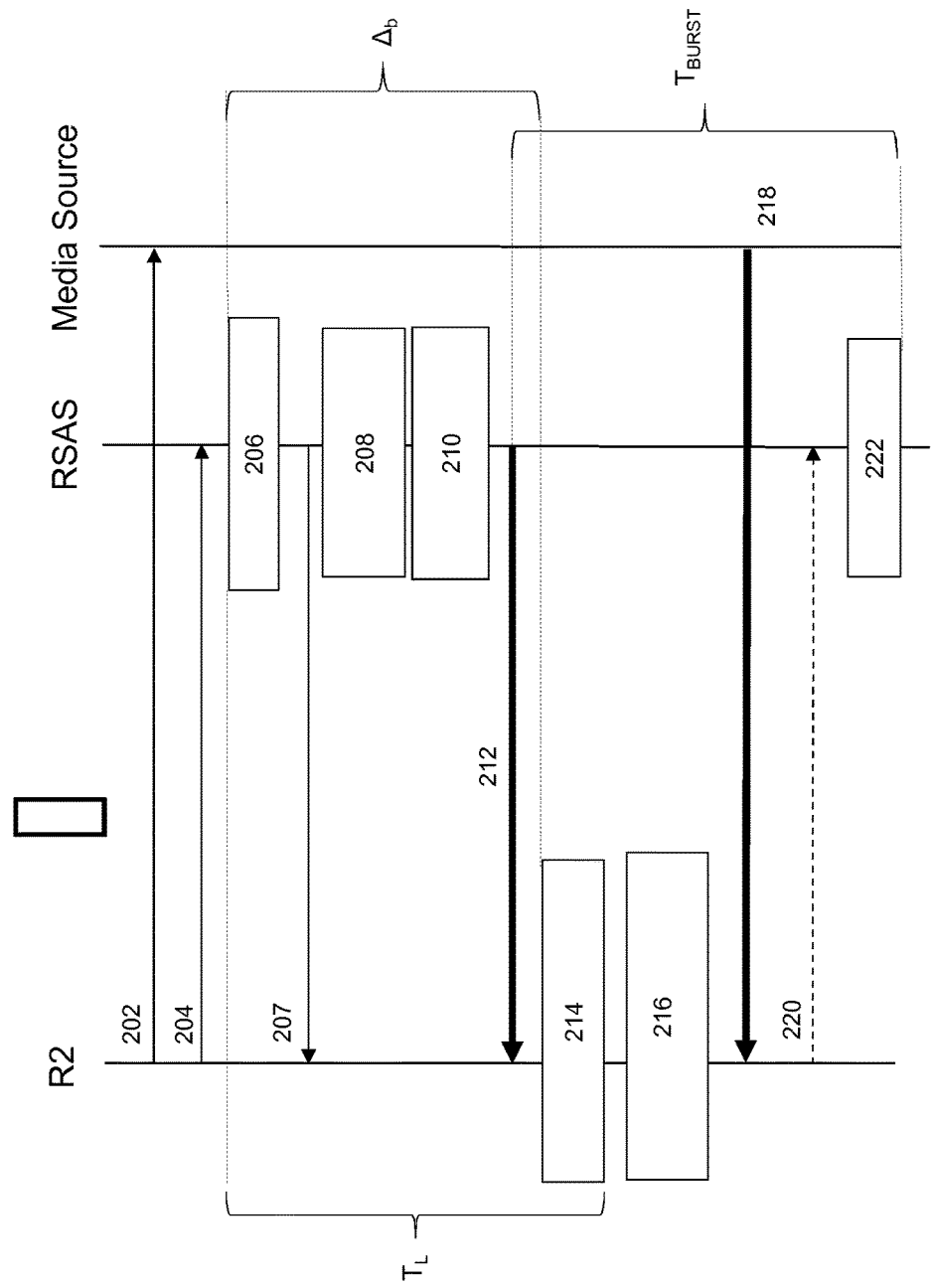
FIG. 2 depicts a flow diagram of a process for synchronization of data processing between receivers according to an embodiment of the invention.

FIG. 2 depicts a flow diagram of a process for synchronization of data processing by a first and second receiver according to an embodiment of the invention. The process may be executed by a system as described with reference to FIGS. 1A and 1B. The process may start with a second receiver R2 requesting data units of a second broadcast stream, e.g. a live stream or a stream associated with a second screen application (step 202) that need to be processed by said second receiver in synch with the processing by a first receiver of data units of a first stream (not shown). The first and second broadcast stream shared a common content time line. Further, a play-out delay $\Delta t_p$ determines the time duration between the media source transmitting a data unit of the first stream to the first receiver and the processing of that data unit by the first receiver.

The request for data units of the second broadcast stream may include transmission of a media request to the media source. The media request may trigger the synchronization client in the second receiver to send a sync acquisition request to the RSAS (step 204). Alternatively, upon receiving the media request, the media source may send a sync acquisition request to the RSAS. The sync acquisition request may comprise (or be associated with) a clock-time as described above.

A synchronization function in the RSAS may use the wall-clock time associated with the sync acquisition request to determine a processing point on the presentation timeline of the first receiver (step 206). The processing point may be associated with the processing of a reference data unit. The processing point may be defined by reference information comprising an identifier of the reference data unit, e.g. an RTP timestamp, and a wall-clock time associated with the processing of the reference data unit by the first receiver. The reference information may be sent to the synchronization client (step 207), which may use the reference information in order to keep track of the content timeline of the first receiver.

The synchronization function may then determine one or more data units of the first stream that—upon the media request—are transmitted by the media source to the first receiver but not yet received and/or processed by the first receiver due to the play-out delay (step 208). These data units may be used to select one or more corresponding data units from a plurality of data units of the first stream that are stored (cached) in a memory (step 210). The thus selected data units may be used for starting a unicast stream to the second receiver. The second receiver may be provisioned with the selected data units from the cache before their corresponding data units of the first stream are processed by the first receiver.

In an embodiment, the start of the unicast transmission may coincide with a so-called random access point (RAP or—in short—an access point) in the second stream. The RAP may define a time on the content presentation timeline of the second stream, where—if decoding/decryption begins at the RAP—all data units (e.g. video frames and/or audio samples) needed for display or sound after this point have no decoding and/or decryption dependency on any data units preceding the RAP.

In an embodiment, each data unit in a stream may be independently decodable and decryptable. In that case, the RAPs on the content timeline of the stream may for example coincide with the play-out times of data units on the content timeline. In another embodiment, only a part of the data units in a stream are independently decodable and decryptable. For example, data units, e.g. video frames, may be arranged in a so-called group-of-pictures (GOP) structure wherein certain data units such as an MPEG P-frame or B-frame may only be decoded on the basis of an associated data units such as an I-frame or P-frame. These data units are not suitable for starting decoding and play-out. Hence, in that case, the RAPs in the stream may coincide with the play-out times on the content timeline of I-frames. The synchronization function may determine a start (start time or start data unit) for the unicast transmission on the basis of a RAP that is positioned on the content timeline before the reference time.

In some embodiment, the synchronization function may select a sequence of data units from the cached data units for transmission in a unicast stream to the second receiver, wherein the length of the sequence may be determined on the basis of the play-out delay $\Delta t_p$ that exists between the source and the first receiver and data unit transmission rate that is used for unicasting the selected cached data units to the second receiver.

Thereafter, the second receiver is provided with the data units that are selected from the data units in the cache before (at least part of) their corresponding data units of the first stream are processed by the first receiver (step 212). The data units may be provided to the second receiver in a unicast transmission. In an embodiment, at least part of the data units may be transmitted at a higher rate to the second receiver than the rate use by the media source in order to transmit data units in the first stream to the first receiver and/or at a rate that is higher than the (processing) rate at which the first receiver processes data units of the first stream.

The second receiver may use the reference information and its (synchronized) wall-clock in order to determine the content timeline of the first receiver and to use this content timeline to process unicasted data units in synchronization with the processing of data units of the first stream by the first receiver (step 214). In an embodiment, the second receiver may start decoding the unicasted data units without actually displaying the data units. In an embodiment, the decoding may be executed at a speed that is higher than the decoding of data units by the first receiver. This way, the second receiver may process the unicasted data units in accordance with a content timeline that is faster than the content timeline of the first receiver.

During the processing (decoding) of the unicasted data units, the synchronization client keeps track of the content timeline of the first receiver. The fast decoding of the unicasted data units may be continued until the content timeline of the first receiver coincides with the content timeline of the second receiver. At that moment, a data unit is processed by the second receiver that coincides with the processing of the same or an associated data unit by the first receiver. This data unit may be referred to as the "now" data unit. At that moment, the synchronization function may determine that the processing of the second receiver and the processing of the first receiver are in sync. The second receiver may then start with the play-out (presentation) of the now data unit and data units following the now data unit (step 216) in accordance with the content timeline of the first receiver. From that moment on, the unicasted data units are played-out by the second receiver in sync with the play-out of data units by the first receiver.

The moment data units of the requested second broadcast stream arrive at the second receiver, it may also start buffering broadcasted data units originating from the media source (step 218). At that moment receiver may switch from play-out of the unicasted data units to the play-out of the broadcasted data units of the second stream that are transmitted by the media source to the second receiver. The transmission of burst data units may then be stopped (step 220). In an embodiment, the synchronization client may notify the synchronization function to stop the transmission of the burst (step 222).

The process depicted in FIG. 2 may realize fast (or even instant) synchronization the processing of data units by a first receiver and the processing of data units by a second receiver requesting a stream. Instead of waiting for the buffer in the second receiver to be filled up with data units of a requested second broadcast stream until it is in sync with the first receiver, the receiver may start processing data units corresponding to the second stream that are unicasted by a cache server to the second receiver wherein the cache server (the RSAS) is configured to store (cache) at least part of the second broadcast stream. This way, the second receiver may almost immediately start processing data units in sync with the first receiver.

In FIG. 2 some characteristic time parameters are depicted. A first parameters regards the time lapse $T_L$ defining the time that is needed by the system to execute the synchronization process from the moment the sync acquisition request is sent to the RSAS up to the moment the synchronization client in the second receiver determines that the play-out is in sync with the play-out of the first stream by the first receiver. The time lapse $T_L$ effectively determines the time that the second receiver needs in order to catch up with the first receiver.

A further parameter is the RSAS delay $\Delta_{RSAS}$, which determines the time that is needed between the sync acquisition request and the decoding of the first data unit that is unicasted to the second receiver. Yet another parameter is the burst time $T_{burst}$, which defines the duration between the transmission of the first and last data unit in the sequence of data units that are unicasted to the second receiver.

Figure 3:
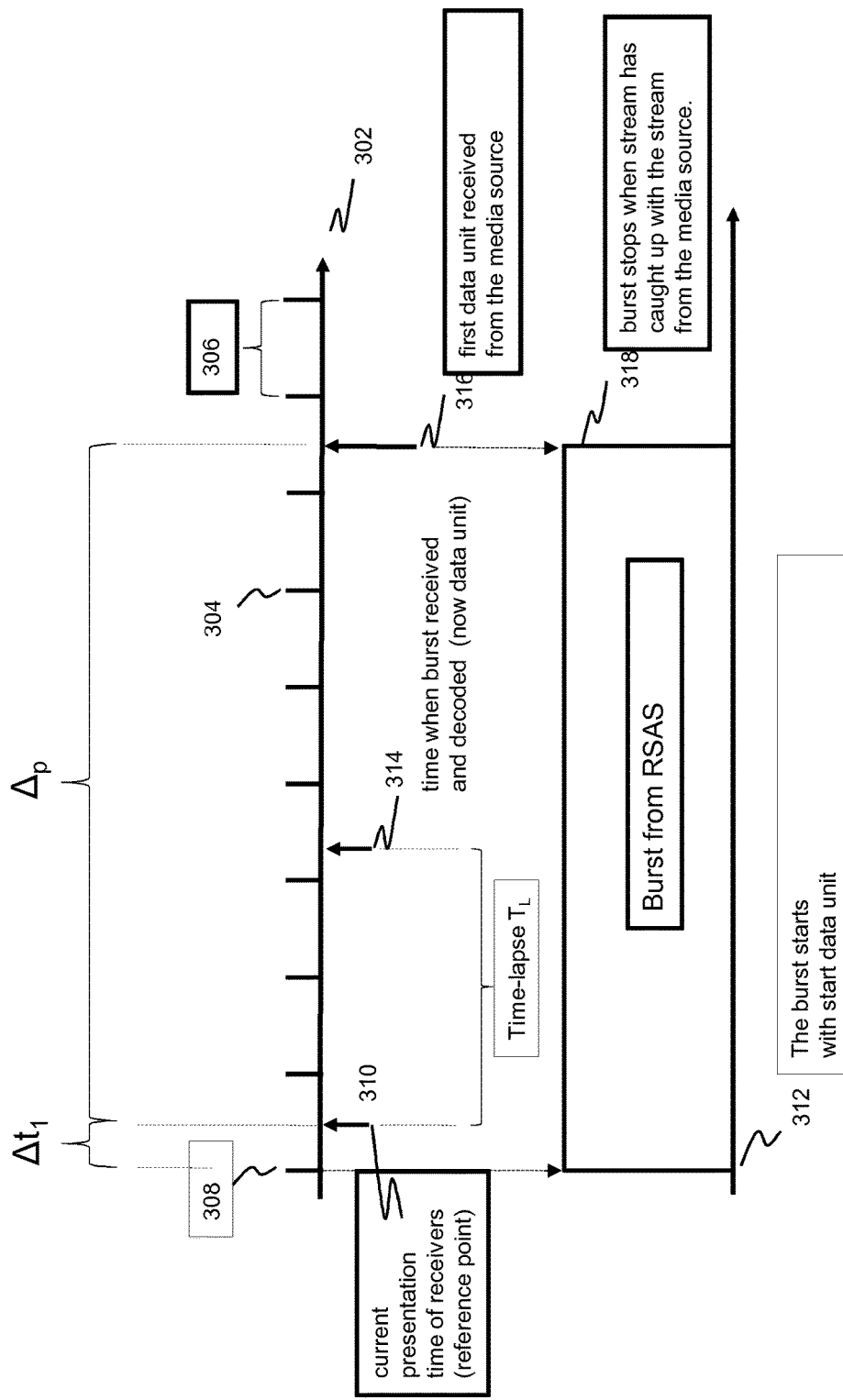
FIG. 3 depicts a schematic of a unicast process according to one embodiment of the invention.

FIG. 3 depicts a schematic of a unicast process according to one embodiment of the invention. FIG. 3 depicts a schematic of a unicast (burst) process as described with reference to FIG. 2 wherein the important events are illustrated on the content timeline 302. The content timeline may comprise RAPs 304, e.g. MPEG I-frames, wherein the distance between two RAPs 306 may be a GOP length. In case the stream has no GOP structure, the distance between two RAPs may be one data unit, e.g. a video frame. In that case, the "start" data unit and the "reference" data unit may be the same.

The schematic depicts reference data unit 310 on the content presentation timeline, which was played-out by the first receiver the moment a media request and/or a sync acquisition request was transmitted to the media source (or received or processed by the media source). The reference data unit may determine a reference point on the content presentation timeline, which may be used to determine a RAP 308 on the content presentation timeline. The RAP may be associated with a first data unit 312 (the "start" data unit) of a sequence of data units in the memory of the RSAS.

Thereafter, the synchronization client may start receiving and decoding data units until the "now" data unit 314 is processed by the receiver. At that point, the processing of data units from the burst by the second receiver has caught up with processing of the data units by the first receiver to the user. The synchronization client may continue filling the receiver buffer with the data units from the RSAS until the stream of data units from the RSAS has caught up and is in sync with the stream of data units from the media source.

Meanwhile the receiver may start receiving data units 316 from the media source. If that is the case, the receiver may start processing data units from the media source and the RSAS may stop the burst process 318. In FIG. 3 further indicates two time periods $\Delta t_1$ and $\Delta t_{sync}$ that may determine a burst length. Here, $\Delta t_1$ is the time difference between the wall-clock time associated with the reference point and the starting point of the burst on the content timeline and $\Delta t_p$ represents the play-out delay (the time difference between time of on the content timeline associated with the play-out of a data unit by the first receiver and a time on the content timeline associated with the data unit leaving the output of the media source). The play-out delay in fact represents the end-to-end delay experienced by the data units when they are transmitted over the network to the receiver and processed by the receiver.

Figure 4:
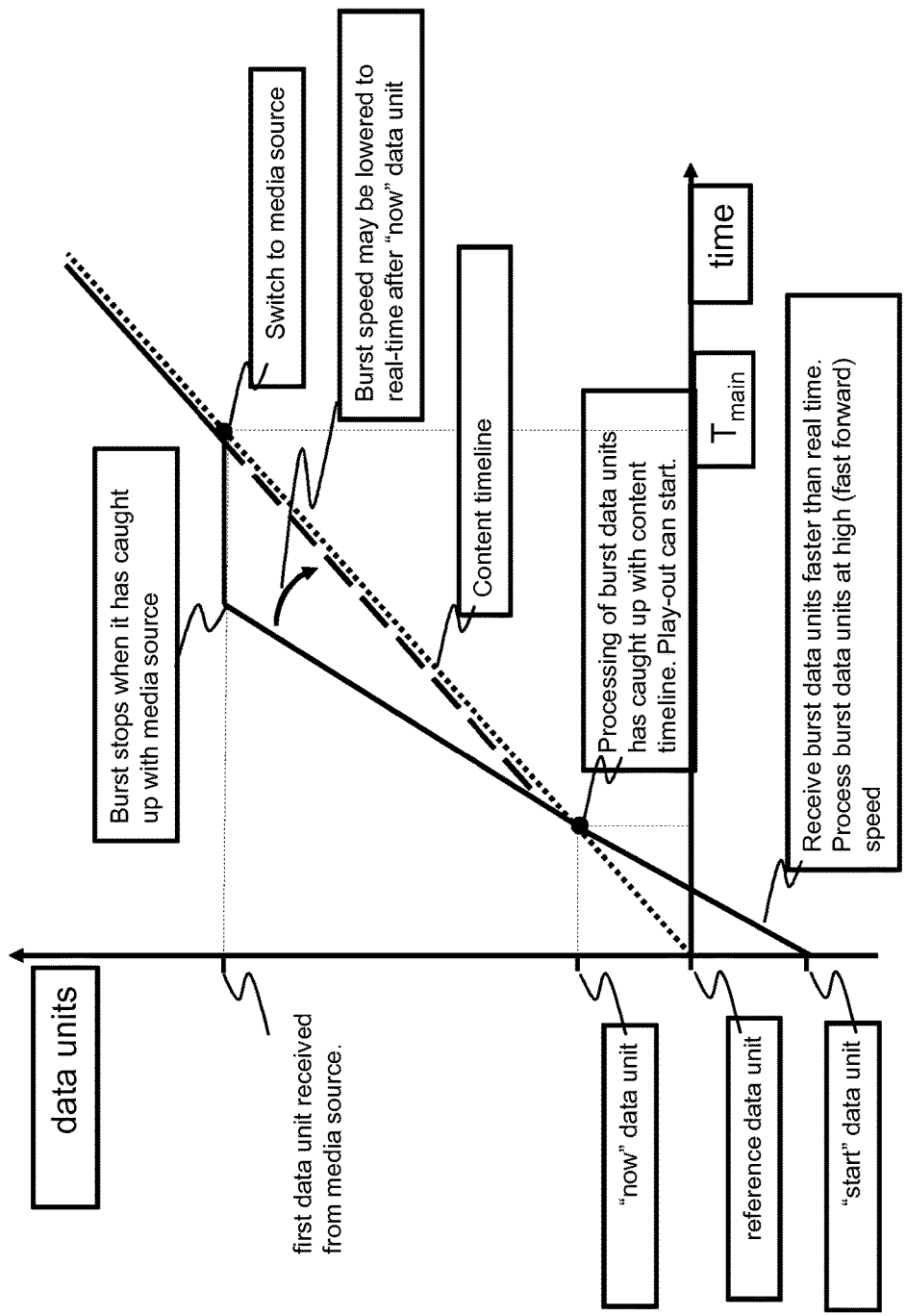
FIG. 4 depicts the transmission of data units in a burst to the second receiver as a function of time.

FIG. 4 depicts a graph, which illustrates the transmission of data units in a burst to the second receiver as a function of time. At t=0, a burst may be transmitted to the second receiver while the first receiver is processing data units in accordance with a first timeline 402. The data unit that is used for initiating the burst may be referred to as the start data unit 410. When the start data unit is transmitted to the second receiver, the first receiver may be processing a (received) reference data unit 408.

Burst data units that are not necessary for decoding and/or decrypting the "now" data unit may be discarded (this process will be discussed hereunder in more detail with reference to FIG. 7). The burst data units may be transmitted on the basis of a rate that is higher than the rate used by the media source and/or at rate that is higher than the rate at which the first receiver processes data units of the first stream (i.e. according to the first content timeline). Further, when the second receiver receives the burst data units, the burst data units may be processed, in particular decoded and/or decrypted, by the second receiver at a higher rate than the rate at which the first receiver is processing data units. In other words, the second receiver may process burst data units in accordance with a content timeline 404 that is faster (steeper) than the content timeline of the first receiver. This way, the processing of the burst data units by the second receiver will "catch up" with the processing of data units by the first receiver.

When the processing of a burst data unit coincides with the processing of a corresponding data unit by the first receiver (i.e. the moment $T_{sync}$ the content timeline of the second receiver crosses the content timeline of the first receiver), the processing of the data units by the first and second receiver are in synchronization. The first burst data unit that is processed in sync with the second receiver may be referred to as the "now" data unit 406. When the second receiver detects this event, it may start processing burst data units in accordance with the content timeline of the first receiver so that synchronized processing of data units by the first and second receiver is achieved. In some embodiments, when the second receiver start play-out data units in sync with the first receiver, the burst rate may be reduced to a rate, which is equal to the rate used by the media source to transmit data units in the first stream to the first receiver. At a predetermined time $T_{main}$ on the content timeline, the second receiver may receive the first data unit of the requested second broadcast stream originating from the media source. At that moment, the stream of data units from the RSAS has caught up with the stream of data units from the media source so that the second receiver may switch from processing burst data units to the processing of data units of the second broadcast stream that are transmitted by the media source to the receiver. From that moment on, the RSAS may decide to terminate the burst process.

Figure 5:
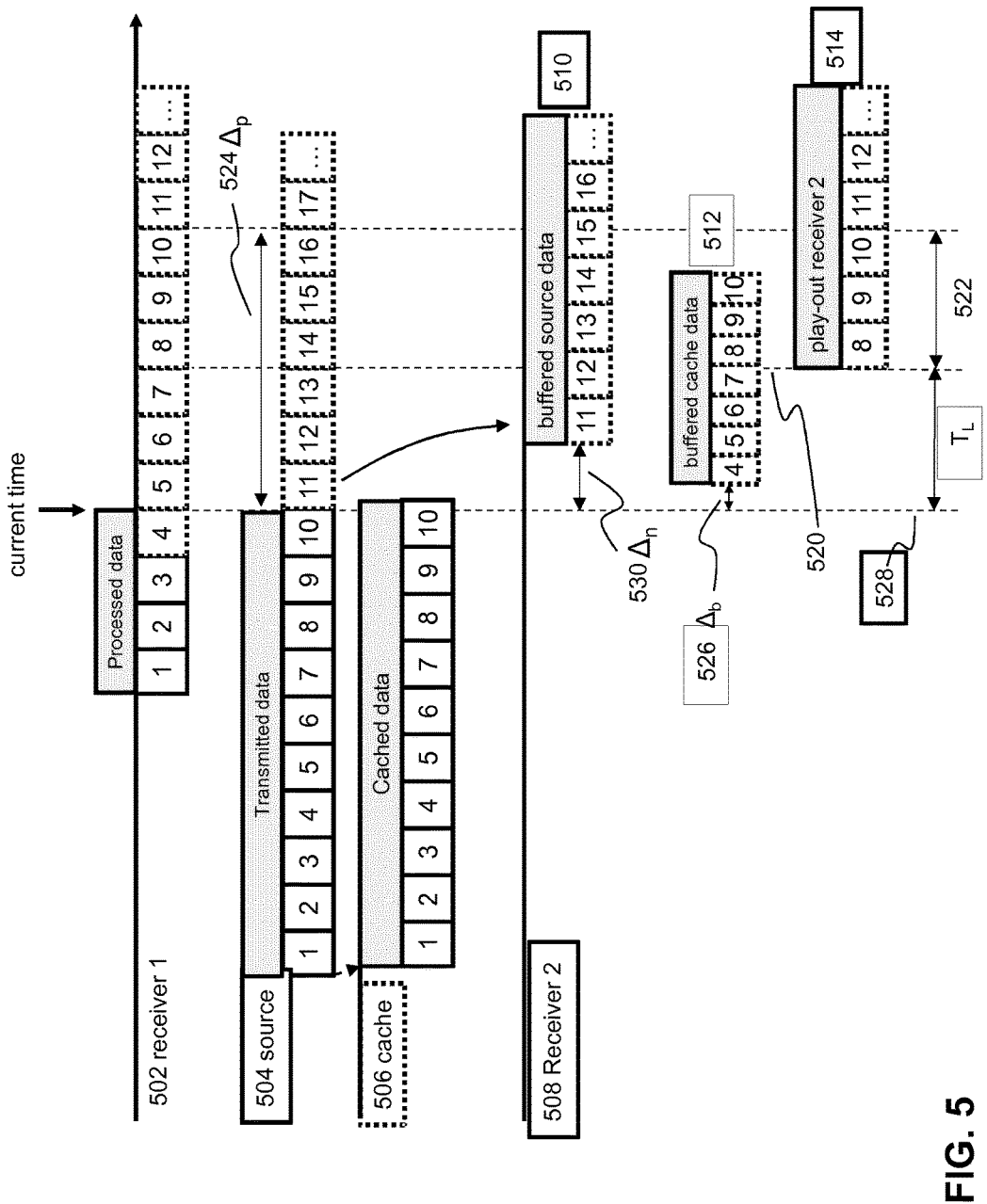
FIG. 5 schematically depicts the processing of data units as a function of time in a system according to another embodiment of the invention.

FIG. 5 schematically depicts the processing of data units as a function of time in a system as described with reference to FIG. 1A according to another embodiment. In this particular example, the data units are unicasted in a burst (i.e. at a high transmission rate) to the second receiver and the burst data units are processed (decoded) by the second receiver at a high rate so that it may quickly catch up with the processing of data units by the first receiver.

At the current wall-clock time $t_o$ (denoted by the dotted line 528), the first receiver 502 is in the process of receiving and processing data units of a first broadcast stream 504 that originate from a media source (not shown). Delays in the network and buffering- and decoding delays at the first receiver cause a play-out delay $\Delta t_p$ 524 between a data unit being transmitted by the content source to the first receiver and the data unit being processed by the first receiver. After the second receiver has requested the stream, the synchronization function in the RSAS may be triggered to determine data units in its cache for transmission in a burst to the second receiver 508. Data units that are suitable of transmission in a burst to the second receiver include data units corresponding to data units of the first stream that have been transmitted to the first receiver but that have not been processed by the first receiver due to the play-out delay, in this example data units 5-10. In some cases however, a data unit such as data unit 5 may not be independently decodable and decryptable (such as for example a P frame) and therefore is not suitable for use as start data unit. In that case, data unit 4 may be selected as independently decodable and decryptable (convertible to 'clear text') data unit that can be used as a "start" data unit.

The thus selected burst data units may be unicasted in a burst (the high rate is symbolically illustrated by the "narrow" data units 4-10) to the buffer of the second receiver 512. A small burst delay $\Delta t_R$ 526 may be present between transmission of a burst data unit by the RSAS and reception of that data unit by the second receiver. After reception of the burst data units from the RSAS, the second receiver may start processing the data units until the processing of data units from the RSAS is in sync with the processing of the data units by the first receiver. This point is denoted by the dotted line 520 indicating "now" data unit (data unit 8). From that moment on, data units in the burst may be processed and played-out by the receiver as depicted by the data units at 514.

Meanwhile receiver may also start receiving data units 510 in its buffer originating the media source. In this particular example, data unit 11 is the first data unit received from the media source. Thus, after having processed burst data unit 10 originating from the RSAS 512, the receiver may switch over to process data units 11 and further that originate from the media source (as depicted in 514). The reduction of the time 522 for the second receiver to start synchronized processing may depend on the time lapse $T_L$, i.e. the time that is needed in order to catch up with the first stream.

In an embodiment, the synchronization function may be configured to determining the start of the burst and the total burst length $T_{Burst}$. As depicted in FIG. 2, the total burst duration $T_{Burst}$ is defined as the time lapsed between the time that the first data unit in the burst is transmitted by the RSAS to the receiver (step 210 in FIG. 2) until the transmission of the last data unit in the burst (step 220 in FIG. 2).

When calculating the burst length, the synchronization function may assume that the rate used by the media source to transmit data units to receivers is a predetermined value x and that the rate used by the RSAS to transmit burst data units in a burst to a receiver (burstrate) may be written in terms of the transmission rate of the stream: burstrate=(1+e)·x wherein e is a positive real number (the dot signifies a multiplication operation).

The total burst duration may be defined as the time required for bursting a burst that starts with a start data unit to the receiver until the receiver receives data units from the main source. On the basis of the following equation:

$$(1+e) \cdot x \cdot T_{Burst} = \Delta t_1 \cdot x + \Delta t_{main-source} \cdot x + \Delta t_{sync} \cdot x$$

the total burst duration may be determined:

$$T_{Burst} = (\Delta t_1 + \Delta t_{main-source} + \Delta t_{sync})/(1+e)$$

wherein $\Delta t_t$ represents a time delay associated with the difference between the reference point and the start point of the burst on the content timeline (as illustrate in FIG. 3). In case data units represent video frames, the delay may be calculated as: $\Delta t_r = T_{ref} - T_{start} = $ (ref frame identifier–start frame identifier)/frame rate.

Further, $\Delta t_{main-source}$ represents the delay associated with the time the reference point on the content timeline is determined by the RSAS and the time on the content presentation timeline when the first data unit is transmitted by the main source to the second receiver. The receiver cannot know this delay this exactly. However, it may be approximated by the time difference between the point in time that the media request 202 and the sync request 204 in FIG. 2 were sent out. If these requests are sent close to each other, this delay will be close to zero.

Finally, $\Delta t_p$ represents the play-out delay associated with the time on the content timeline a data unit is processed (e.g. displayed) by the first receiver and the time the data unit is leaving the output of the main source.

Another important time parameter is the time lapse $T_L$ which represents the time that it takes for the burst to catch up with the content presentation timeline, i.e. the time it takes to make up for $\Delta t_1$ and $\Delta t_R$, while in the mean time, the content is consumed at a rate x by the other receivers. Here, $\Delta t_R$ represents the delay between the RSAS and the receiver, i.e. the delay between determining the start data unit in the memory of the RSAS and the processing of the start data unit by the receiver. Then from the equation:

$$(1+e) \cdot x \cdot T_L = (\Delta t_1 + \Delta t_R) \cdot x + T_L \cdot x, \text{ so:}$$

the time lapse $T_L$ may be determined:

$$TL = (\Delta t1 + \Delta t_R)/e$$

The time lapse TL is a measure for how fast the burst catches up. If the burst rate (determined by e) is too low, the burst will not catch up fast enough. A good figure is that $T_L < \Delta \Delta t_{sync}$.

In the above equations, a simplification is used in the sense that the amount of bits between the start data unit and the reference data unit is determined as $\Delta t_1 \cdot x$ and the amount of bits between the reference data unit and the now data unit is determined as $T_L \cdot x$. However, if a stream has a GOP structure, the bits are not distributed evenly. In that case, the I-frame uses the most bits, then the P frame and finally the B-frame.

Figure 6:
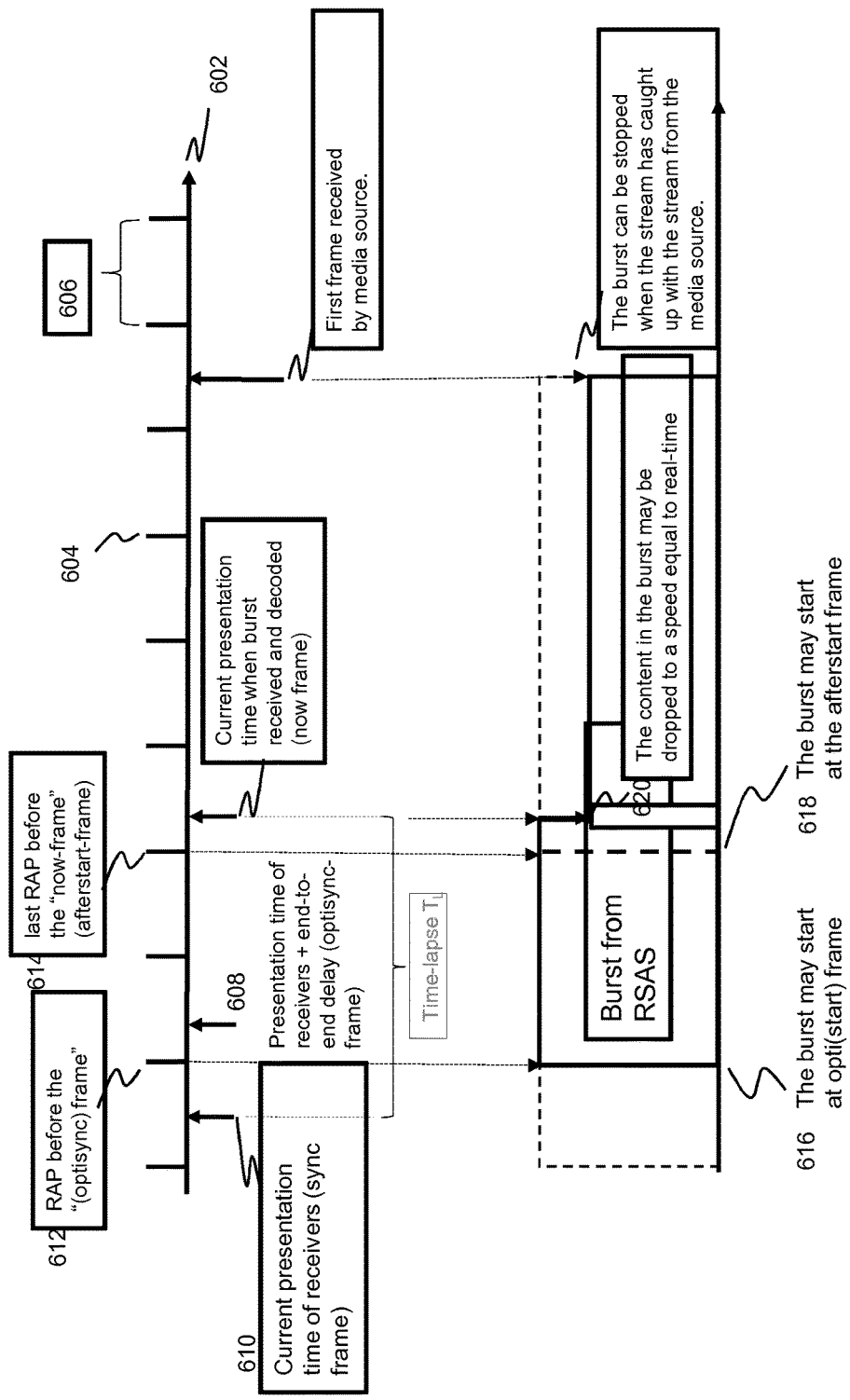
FIG. 6 depicts a schematic of a burst process according to another embodiment of the invention.

The processes of transmitting frames in a burst to a synchronization client as described in this application may be further improved in various ways. FIG. 6 depicts a schematic of an optimized bust process according to various embodiments of the invention. The improvements of the burst process are compared with the burst process as described with reference to FIG. 3, wherein the important events are described with respect to the content timeline 602. The content timeline may comprise RAPs 604, e.g. MPEG I-frames, wherein the distance between two RAPs 606 may be the GOP length. In case the stream has no GOP structure, the distance between two RAPs may be one data unit, in which case the "start" data unit and "reference" data unit may be the same. Although data units in FIG. 6 are referred to as video frames other types of data units are also envisaged.

In an embodiment, the burst process may be corrected for the burst delay, i.e. the end-to-end delay $\Delta t_b$, between the receiver and the RSAS. For example, in case the synchronization client knows the end-to-end delay between the receiver and the RSAS, the synchronization server may determine a reference point 608 on the content presentation timeline that is associated with the current wall-clock time plus the end-to-end delay. The data unit associated with the current wall-clock time plus the end-to-end delay between a receiver and the RSAS may be referred to as an "opti"-reference data unit.

Hence, instead of determining a reference point in step 206 of the process in FIG. 2, an opti-reference point may be determined. This reference point may be used in subsequent steps of the process of transmitting a burst to the receiver. This way the burst can be made shorter thereby acquiring faster synchronization because the time between the start data unit and the now data unit is shorter. In particular, when determining the RAP on the content timeline (as described in step 208 of FIG. 2), the RAP before the opti-reference point 612 instead of the RAP before the reference point may be determined. The data unit associated with the RAP before the opti-reference point may be referred to as an opti-start data unit. The RSAS may use to opti-start data unit to start the burst. As can be seen from FIG. 6, the use of the opti-start data unit may provide the effect of a shorter burst than using the start data unit thereby acquiring faster synchronization.

There may be several ways for the synchronization client to determine the burst delay $\Delta t_b$. In case it is constant, a synchronization client may have determined this delay from a previous session. In another embodiment, the synchronization client may estimate the end-to-end delay on the basis of some network parameters. In yet another embodiment, a synchronization client may first determine the "normal" reference point, provide the reference information to the RSAS, wait for the first data unit in the burst to arrive and measure the end-to-end delay. The synchronization client may then determine the opti-reference point on the basis of the measured end-to-end delay and resend the opti-reference timing information to the RSAS.

In a further embodiment, the RAP may be determined while taking the burst rate into account. In that case, after determining the reference point, the RSAS may start an internal timer (see also FIG. 8, feature 834). Then, based on the rate of the burst and the internal timer, the RSAS may determine that the burst is not going to catch up with the presentation timeline before the next RAP. In that case, the RSAS may start the burst on the basis of a data unit associated with the next RAP or the RAP before the now data unit 614. The data unit associated with the next RAP or the RAP before the "now" data unit may be referred to as an "afterstart" data unit.

In an embodiment, the RAP may be somewhat beyond the point on the content timeline associated with the current wall-clock time. In that case, the burst rate may be similar to the rate used by the media source to transmit the first stream to the first receiver. The RSAS may use the "after-start" data unit to start the burst. Using of the "afterstart" data unit as the start of the burst may further shorten the burst and therefore acquire faster synchronization. In a further embodiment, after the processing of the data units by the second receiver has caught up with the processing in accordance with the content timeline of the first receiver, the RSAS may lower the burst rate 620 to a rate equal to the rate used by the media source.

In a yet further embodiment, before sending the burst data units to the synchronization client, the RSAS may discard one or more burst data units which are positioned between the RAP and the (opti)reference point on the content timeline and which are not required by the receiver to decode/decrypt the (opti) reference data unit. Such data units may include B-frames that should be played-out before the (opti)reference data unit. This process is depicted in more detail in FIGS. 7A and 7B.

Figure 7A:
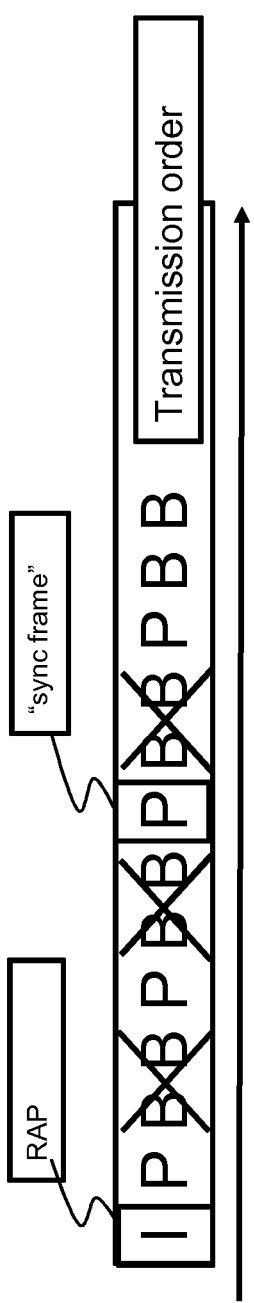
FIG. 7A depicts the process of discarding frames according to an embodiment of the invention.
Figure 7B:
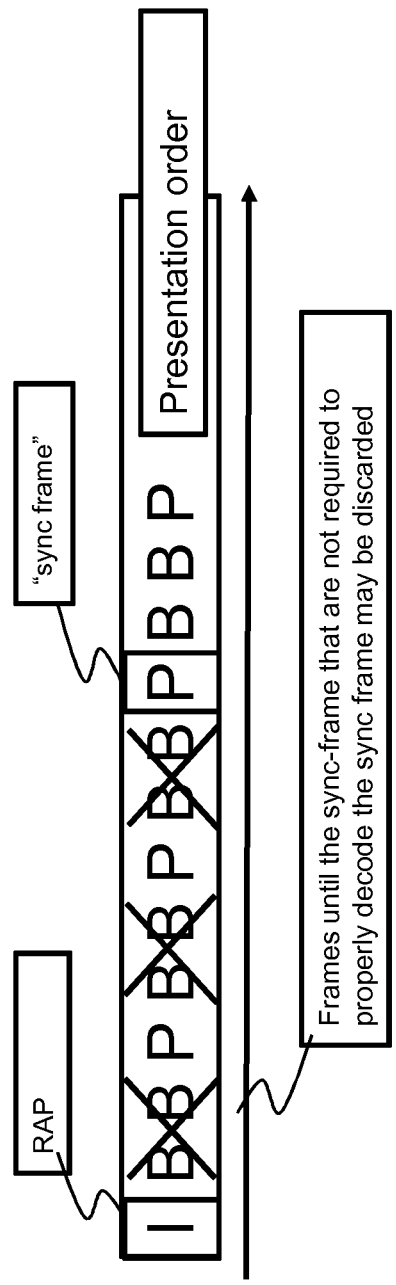
FIG. 7B depicts the process of discarding frames according to an embodiment of the invention.

FIG. 7A depicts a transmission order of data units in a GOP structure that are transmitted in a burst the receiver. The RAP may be associated with an I-frame and the reference data unit may be associated with a P-frame. FIG. 7B illustrates the presentation order of data units in a GOP structure (which in this case is different from the transmission order). FIG. 7B further illustrates that 6 B-frames are not required in order to decode and play-out the sync frame. These B-frames may therefore be discarded. Hence, when transmitting the burst to the synchronization client, these six B-frames (two sets of B-frames between the RAP and the sync frame and two B-frames after the sync frame) may be discarded when transmitting data units to the synchronization client. This way, the amount of data units (frames) transmitted in a burst to the client may be further reduced.

In an embodiment, the process of discarding frames in the burst may also be extended to data units after the reference data unit. In that case, the RSAS may start a timer and measure the time that has elapsed since the burst has started. Thereafter, on the basis of the timer, the RSAS may discard any frame after the (opti)reference data unit up to the "now" data unit that is not required to present the "now" data unit properly (i.e. for which the now-frame has no decoding dependency). The RSAS may calculate the discarded frames on the basis of the rate of the burst (which dictates how fast the burst can catch-up with the presentation timeline) and the timer setting as described above.

Figure 8:
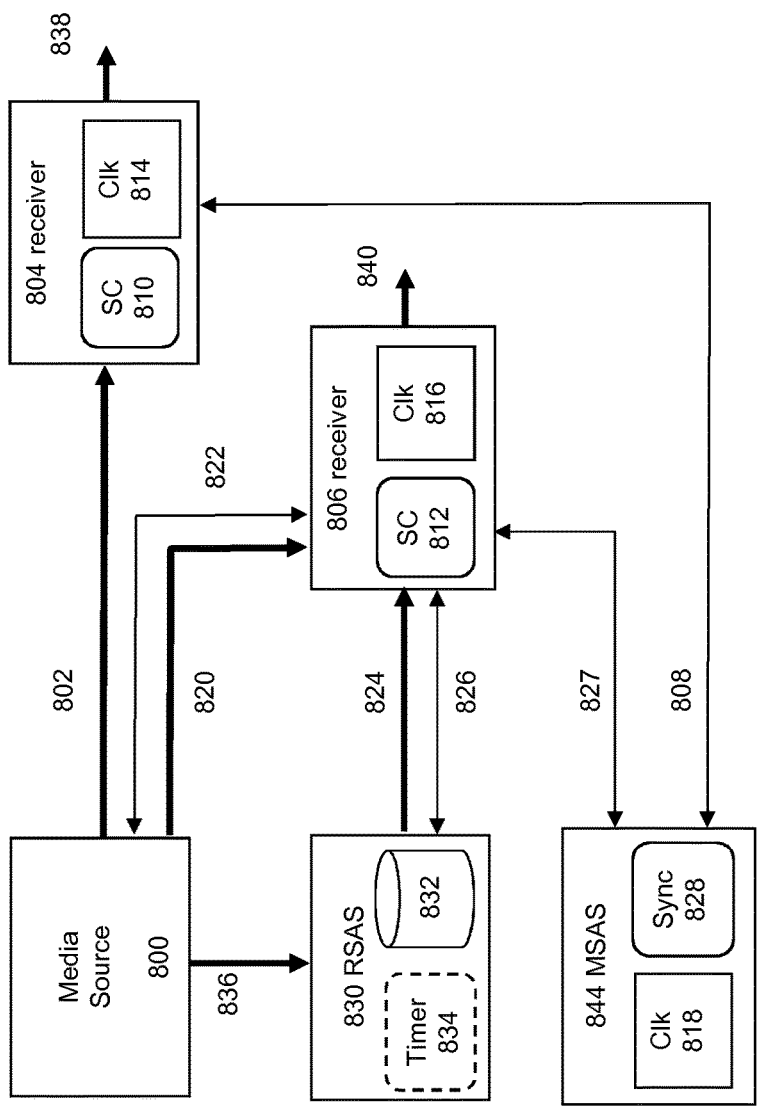
FIG. 8 depicts a system for synchronizing the processing of data units between receivers according to another embodiment of the invention.

FIG. 8 depicts a system for synchronizing the processing of data units by different receivers according to another embodiment of the invention. The system in FIG. 8 may be similar to the one depicted in FIG. 1A with exception that the synchronization function is implemented in a media synchronization application server (MSAS) 844, which is separate from the RSAS and which is configured to establish an IDMS-synchronization session between a group of receivers. The first receiver 804 may be part of this group of synchronized receivers. The MSAS may comprise a wall-clock 818, which is synchronized with the wall-clocks of the receivers 814,816 and the RSAS (not shown). Hence, in contrast with the system depicted in FIG. 2, the RSAS is not aware of the content timeline of the synchronized receivers associated with the IDMS system. The content timeline of the synchronized receivers may be referred to IDMS content timeline.

In order to achieve an IDMS synchronized state, each receiver e.g. a first receiver 804 and a second receiver 806, may comprise a synchronization client SC 810,812 and a synchronized wall-clock, e.g. an NTP-synchronized clock 814,816. A synchronization client may be configured to transmit timing information 808 to MSAS, which may also comprise a synchronized wall-clock 818 that is in sync with the wall-clocks of the receivers.

Hence, the MSAS may use the timing information 808 originating from the first synchronization client in the first receiver 804 to determine a point on the presentation timeline associated with the processing of a data unit by the synchronized receivers. When the processing is related to the play-out of the data unit to the user, the timing information may represent the play-out time (presentation time) of a particular data unit on the content presentation timeline. The synchronization client may send timing information as part of a special data structure, e.g. an IDMS report, to the synchronization server.

The synchronization function 828 in the MSAS may use the timing information of the different synchronization clients in order to determine whether the receivers are still in sync. To that end, the synchronization function may use the timing information of the different receivers to check where there is a difference in the presentation time of a particular data unit by the different receivers.

For example, the first receiver may report the presentation time 01:23:45.678 (NTP_RCVR1) of a frame (a data unit formed by one or more RTP packets with the same RTP timestamp) associated with RTP timestamp 2070000 (RTP_RCVR1_reported); and, the second receiver may report the presentation time 01:23:46.678 (NTP_RCVR2) of a frame associated with RTP timestamp 2250000 (RTP_RCVR2_reported).

When the MSAS is provided with an RTP timestamp clock frequency, e.g. 90000 Hz, the MSAS may first determine the most delayed receiver by selecting, e.g. a reference timestamp, and subsequent calculation of the other timestamps using the reference timestamp as a basis. For example, the MSAS may select the presentation time of the first receiver and calculate the RTP timestamp of the second receiver at this presentation time: RTP_RCVR2_calculated=RTP_RCVR1_reported+90000* (NTP_RCVR2−NTP_RCVR1). The result of this calculation is RTP_RCVR2_calculated=2160000, indicating that the first receiver is the most delayed receiver. In other words, at the presentation time NTP_RCVR1, the RTP timestamp value of the data unit presented by the second receiver is larger than the one associated with first receiver. In order to achieve inter-destination synchronization of the content play-out 838,840 by the receivers, the first and/or second receiver has to adjust the play-out at the output using e.g. a variable delay buffer (not shown). This adjustment is realized on the basis of synchronization information, which is transmitted by the MSAS to a receiver (e.g., the second receiver) for adjusting its play-out.

The adjustment of the play-out may be achieved by delaying the play-out of the media stream at the receivers until the synchronization is restored. As the differences in the reception time of (linear) content may easily amount multiple seconds, IDMS may introduce a substantial delay in the initial play-out time of the content. When joining an IDMS-synchronized session, a client may have to buffer the stream for a predetermined time before it can start watching the stream. This would provide IDMS-synchronized streaming sessions an unacceptable degradation in the user experience.

In order to counter the problem of large delays in the initial play-out time for receivers that join an IDMS-synchronized (live) streaming session, the system may use an RSAS 830 similar to the one described with reference to FIG. 1A wherein the RSAS may be configured to buffer data units that are sent by the media source to the receivers. The data may be buffered in a memory 832 of the RSAS. The RSAS may receive data units in similar ways as the described with reference to FIG. 1A. For example, it may receive data units from the media source over a low-delay (multicast, broadcast or unicast) channel 836 so that the memory of the RSAS always comprises the most recent data units, which were transmitted by the media source to the receivers.

A second receiver 806 may send a media request 822 to the media source for joining a synchronized streaming session. In response to this request, the media source may transmit a stream 820 to the receiver. Further, the MSAS and the RSAS may be configured to exchange information 826,827 with the second receiver for enabling determination of a burst start and burst length that may be used by the RSAS to transmit a predetermined amount of data units in a burst 824 to the second receiver. In this particular case, the MSAS has knowledge of the synchronization session, which includes knowledge of the IDMS content timeline (i.e. the content timeline of the synchronized clients) and the play-out delay $\Delta t_p$ that exists between a data unit being transmitted by a source to a group of synchronized receivers and the data unit being played-out by these receivers. The information exchange between the second receiver and the MSAS and RSAS will be discussed in more detail with reference to FIG. 9.

Further, in some embodiments, the RSAS may comprise a timer 834 in order to accurately determine a set of frames that is sent in the burst to the receiver. The data units in the burst may allow the second receiver 806 to catch up with the stream that is transmitted by the media source before it actually joins or tunes into a media stream. This way, this way the time needed for a receiver to join or tune into a synchronized stream may be substantially improved. The synchronization process will be explained in more detail with reference to FIG. 9.

Figure 9:
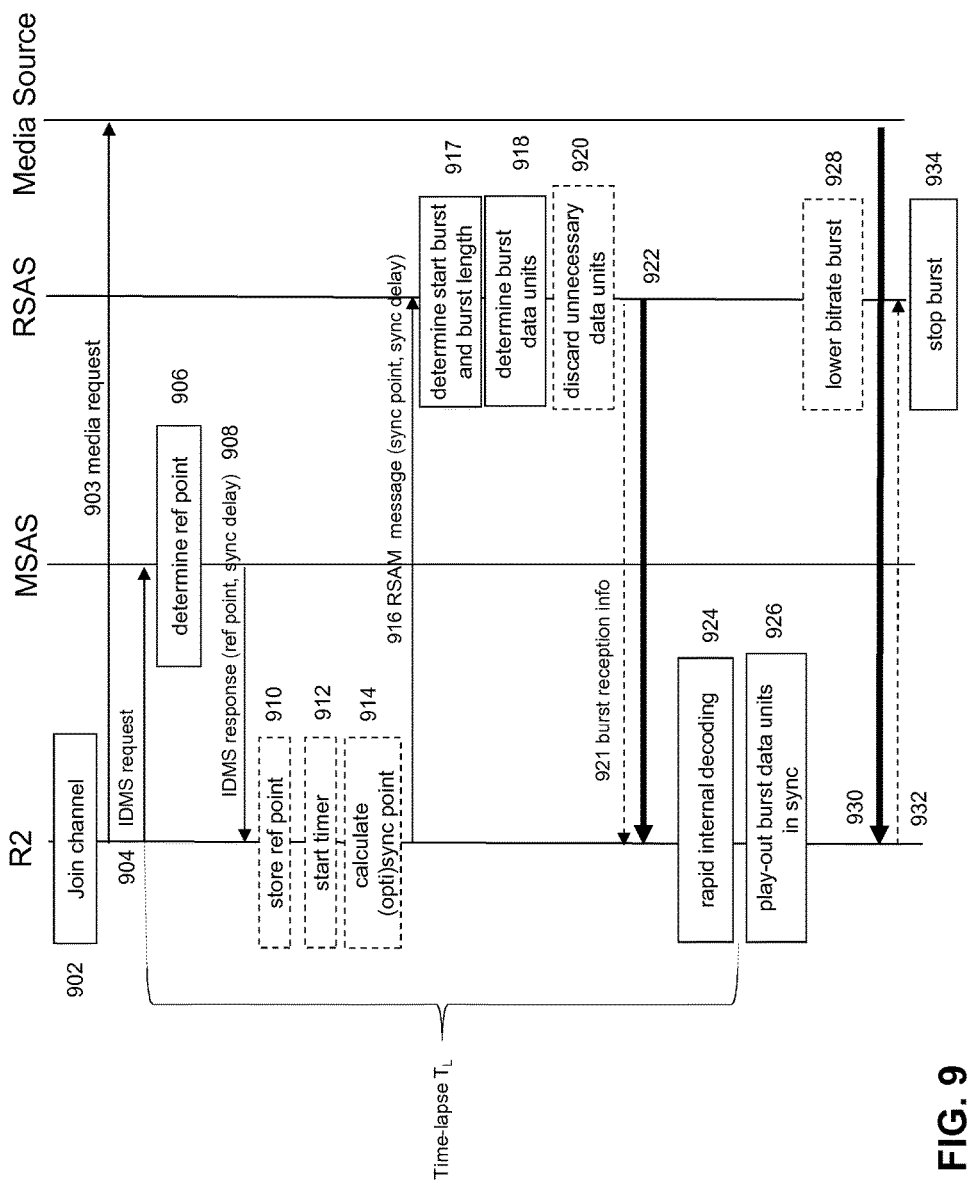
FIG. 9 depicts a flow diagram of a process for synchronization of data processing between receivers according to another embodiment of the invention.

FIG. 9 depicts a flow diagram of a process for initial play-out synchronization according to an embodiment of the invention. In particular, FIG. 9 depicts a flow diagram of a process that may be executed on a system as described with reference to FIG. 8 wherein the RSAS is implemented as a separate network entity. The synchronization may be established between a second joining receiver RC2 and one or more receivers (not shown) that already participate in the IDMS-synchronized steaming session (which is managed by an MSAS).

The process may start with a decision (e.g. by a user or another entity) to join an IDMS-synchronized streaming session (step 902). To that end, the synchronization client may send a media request to the media source (step 903). The synchronization client may send an IDMS request for joining the synchronized streaming session to the MSAS (step 904). Upon receiving the IDMS request, the MSAS may determine a reference point on the IDMS content timeline of the synchronized receivers (step 906). The reference point may be defined by reference information. The reference information may comprise a reference data unit identifier and an associated reference wall-clock time (i.e. the wall-clock time of the reference data unit that was played-out by the synchronized receivers). Further, delay information may be determined, which may include the play-out delay $\Delta t_p$ that is used by the synchronization function to calculate the burst length.

The reference time may be determined using the (synchronized) wall-clock time of the MSAS. In an embodiment, the reference presentation time may be determined by a wall-clock (NTP) time-stamp. In one embodiment, the reference point may relate to the point in time on the content presentation timeline associated with the current wall-clock time at which the second receiver joins or tunes into a media stream from the media source. In another embodiment, the reference point may be an arbitrarily point on the content presentation timeline earlier than the current wall-clock time. The MSAS may send the reference information and the delay information to the synchronization client (step 908).

In case a low-delay communication channel or a communication channel with a known delay between the synchronization client and the MSAS is used, the reference information does not need to comprise a wall-clock timestamp. In that case, the wall-clock time at which the IDMS response is received by the synchronization client may be used as the reference wall-clock time.

In some embodiments, the processing of information between the MSAS and the synchronization client may cause some time to lapse between determination of the reference point and the transmission of the reference information to the RSAS. In that case, the reference information may be used to determine a new reference point on the presentation timeline associated with the current clock-time (i.e. a time at which the information associated with the new reference point is transmitted to the RSAS). This new reference point may hereafter be referred to as the synchronization point.

In an embodiment, the synchronization client may be configured to calculate the synchronization point. To that end, the synchronization client may store the reference information in a memory of the receiver (step 910) and start an internal timer (step 912) that measures the difference between the stored reference time and the current wall-clock time. This difference is subsequently used to determine the synchronization point, i.e. the point on the IDMS content timeline of the synchronized receivers that is associated with the current wall-clock time (step 914). The synchronization client may then send the synchronization information in a rapid synchronization acquisition message (RSAM) to the RSAS (step 916). In an embodiment, the RSAM may comprise the play-out delay.

In case the reference point is determined as the point on the content presentation timeline associated with the transmission of the IDMS request to the MSAS and, additionally, the processing and transmission between synchronization client and the MSAS is fast, the reference point may be identical to the synchronization point. In that case, the client may directly forward the reference information to the RSAS. In an embodiment, the reference information may be sent in IDMS response to the client (in an RSAM message).

In an embodiment, burst transmission information may be sent to the client. The burst transmission information may include buffer size information, e.g. a minimal and/or maximal buffer size. The buffer size information may be used by the RSAS to configure the burst so that an overflow or underrun of the buffer of the synchronization client is prevented. In another embodiment, the burst transmission information may include a maximum rate for transmitting data units in the burst to the synchronization client so that the burst will not exceed the capacity of the communication channel between the RSAS and the synchronization client.

The RSAS may receive the RSAM message comprising the synchronization information and, optionally, the burst transmission information. Thereafter, the synchronization function in the RSAS may use the synchronization information and the play-out delay in order to determine a burst start and a burst duration (step 917), to select burst data units from a plurality of data units that are stored in a memory (step 918) and to discard unnecessary data units, i.e. data units that are not necessary for decoding/decrypting the start data unit may be discarded (step 920) in a similar way as described with reference FIG. 2 (see in the particular steps 208 and 210).

In another embodiment, the RSAS may send the synchronization client burst reception information (step 921). For example, in one embodiment, the burst reception information may comprise an earliest join time $T_j$ associated with the earliest time that the receiver may join the stream that is broadcasted (for example multicasted) by the media source. Further, the burst reception information may comprise an indication whether one or more data units between the RAP and the synchronization point that are not required for decoding/decrypting (e.g. one or more P-frames) are discarded. The burst reception information may further comprise: the reference to the RAP (e.g. the RTP timestamp, in order to allow the synchronization client to verify whether it did not miss a frame in the burst), a burst duration; and/or, the maximum burst transmission rate.

The RSAS may then transmit the burst to the receiver, wherein transmission of the burst may start the start data unit (step 922). The burst may comprise a sequence of frames and/or audio samples, which may be provided at a high rate (faster than the content presentation timeline) to the receiver.

Upon receiving the burst, the synchronization client may check its current wall-clock time and determine the data unit identifier (e.g. an RTP time stamp) associated with the current presentation time on the content presentation timeline. In order to determine this data unit identifier, the synchronization client may have to compensate for the time $T_L$ that has elapsed between the reception of the information from the MSAS (i.e. the reception of the reference information as described with reference to step 908) and the reception of the burst and processing by the RSAS (as described with reference to step 922 and 924). The synchronization client may determine $T_L$ by calculating the difference between the current wall-clock time and the wall-clock time associated with the synchronization point. The elapsed time $T_L$ may then be used to determine the data unit identifier (frame identifier) that is associated with the current presentation time on the IDMS content presentation timeline of the synchronized receivers.

Further, when receiving burst data units, the receiver may start internally processing the burst data units without actually displaying them at a high (fast forwarding) speed. Thereafter, the processing of the burst data (step 926), the reception of data units of the broadcast stream (step 930), the switch from processing burst data units to processing broadcasted data units from the content source and the stop of the unicast transmission (steps 932 and 934) may be similar to those described in FIG. 2.

It is submitted that the process steps in FIG. 9 are not limiting and that many variations are possible without leaving the essence of the invention. For example, in an embodiment, the second synchronization client in the second receiver may comprise burst algorithm in order to determine a data unit for starting the bus. Hence, in that case, step 917 is performed by the second receiver and the RSAM message may comprise information on the burst period so that the RSAS may determine the burst data units. Further, depending on the delays in the network, the second receiver may receive data units from the media source at an earlier time in the process. Moreover, all further improvements on determining the burst period and burst data described with reference to FIGS. 6 and 7 may also be implemented in the process of FIG. 9.

Hence, the process as depicted in FIG. 9 may realize fast (or even instant) synchronization a receiver joining a synchronized. Instead of waiting for the buffer in a receiver to be filled up so that it is in sync with the slowest receiver (as in a conventional IDMS system), the receiver may start to join the same stream from a cache server, the RSAS, for a short period of time. The RSAS may be configured to cache the live stream, so the receiver can start watching the stream almost immediately. Furthermore, the process in FIG. 9 allows the RSAS to be implemented as a third party application.

A new receiver that joins a live stream session is given the live stream back in time, at the same point that all other (IDMS-synchronized) receivers are currently playing out. This way, the receiver will be immediately in sync with all the other receivers. The RSAS may send the content faster than real-time (in a burst) to the synchronization client in the receiver, so the receiver buffer is filled up and the user can start watching immediately.

On the basis of the data units in the burst, the receiver is able to catch up with the live stream that is broadcasted (for example multicasted) by a media source to all the receivers. The receiver may then switch over to the original source. The invention thus provides methods and systems that allow a user of a receiver to start watching immediately upon joining an IDMS session, while the network may still use a single streaming source for scalability purposes. The invention further allows fast initial play-out synchronization of receivers from different networks, while not having to wait for the slowest receiver before play-out begins for late joiners.

The invention as described in the disclosure is not limited to the use of RTP for the delivery of the media content. Any media delivery method that uses broadcast, multicast, or in some other way does not control the packet arrival times itself may benefit from the method described in the invention. Examples of such methods are the various DVB technologies such as DVB-C, DVB-S and DVB-T.

When applied to DVB streams, the method for achieving synchronization of data processing by receivers is similar to the method used in the RTP case. DVB streams are cached on the server side and made available for unicast retrieval via a client requesting a particular time range. The main difference between RTP and DVB streams is the method for addressing a particular time range in the content stream.

In case the RTP protocol is used for transmitting data units to the receivers, RTP timestamps may be used to indicate particular video frames and relate them to wall-clock times (such as the start timing information and the synchronization timing information), other delivery mechanisms are able to provide similar timing information. DVB-based delivery methods may use MPEG-2 TS streams (MPEG 2 Transport Streams) for delivery of the data units to the receivers. Within an MPEG 2 TS stream, timing is maintained using so-called PTS (Presentation Time Stamp) values, which are embedded in the Packetized Elementary Stream. Since these PTS values uniquely identify particular frames or audio samples within a stream, PTS values may be used by the instant initial play-out sync method as a way of indicating a particular position of a data unit on the content presentation timeline.

Alternatively, another way to communicate instants in a DVB stream is by using DVB Timeline packets as described in TS 102 823. An advantage of using Timeline packets instead of the PTS values is that Timeline packets may be inserted on a content-level and not on a transport-level. This means that data units in a TV program broadcasted over different DVB networks are associated with different PTS values, but may have the same Timeline values.

The receiver may use various ways to request a cached unicast stream from the cache server. In an embodiment, a HTTP-based streaming technique may be employed to retrieve the stream from the cache server. This may for instance be MPEG DASH, wherein on the basis of a manifest file segments are requested from the cache server. It is understood that in those embodiments the cached unicast streams are stored according to the applicable segmentation formats as (series of) segments, e.g. small files containing time-consecutive chunks of content of the media stream. In a preferred embodiment, MPEG DASH with MPEG-2 TS segments may be used for transmitting a burst to a receiver. The advantage of this is that the caching server does not have to actively transcode or repackage the part of the DVB stream that is buffered by the RSAS. Instead of MPEG DASH, the segments, preferably the HTTP based segments may be based on other segmentation techniques, such as HLS (HTTP Live Streaming) or Smooth Streaming or HDS. The segmented streams need not be encoded according to the MPEG-2 format, but likewise may be based on other suitable encoding formats as well, e.g. MPEG-4 based or MPEG-4 related formats (MP4 file format, DivX, QuickTime). It should be noted that either a pull mechanism may be used (e.g. the receiver requests a segment (also referred to as chunk or fragment) on the basis of a manifest file, or a push mechanism, wherein the cache server may push one or more segments to the receiver (without receiving a request for a specific segment first), using the techniques herein described, including the fast channel change techniques.

In an embodiment, the RSAS (which in one embodiment may be implemented as a DVB capable receiver) may store the incoming DVB stream as segments, preferably as (raw) MPEG-2 TS segments. For example, when buffering data, the RSAS may create one or more new segments associated with a part of the DVB/MPEG-2 TS stream. Further, in an embodiment, the RSAS may be configured to maintain range information for identifying which PTS range or Timeline range is placed in which segment (e.g. Segment 2 contains PTS values between 14291 and 14573 or Timeline 00:01:10 to 00:01:20). Whenever a synchronization client requests a particular time range from the RSAS, the RSAS may look up which segments in its memory overlap with that range, and send these segments in a burst to the client. In a further embodiment, the RSAS may be configured for: creating a manifest comprising location information of (overlapping) segments; sending the manifest to a client in a receiver, wherein the client may sequentially request the segments listed in the manifest file.

Further, the above described fast initial play-out synchronization systems and processes allow a receiver to (almost) instantly join an (IDMS-based) synchronized streaming session. Conventional Fast Channel Change (FCC) mechanisms do not take initial play-out requirements into account and differ from the invention on many points. In conventional FCC mechanisms the receiver would just start to present the RAP whenever it receives that information without taking into account the content presentation timeline associated with the play-out of data units in a stream by a receiver, which is different from the one that requests the stream. Further, in some of the embodiments of the initial play-out synchronization process according to the invention, it may be the receiver that determines the sync-frame and based on this information, the RSAS may need to find the RAP associated with the reference or synchronization point. The receiver may need to start a timer to keep track of the time-lapse (and the associated point in the content presentation timeline) from the moment the IDMS packet of the MSAS has received and from the moment the first data units from the burst arrive. Moreover, the receiver has to start presenting the first frame (not necessarily the RAP frame) immediately in synchronization with the content presentation timeline that is calculated on the basis of the time-lapse.

It is submitted that it is clear for the skilled person that the process sequence depicted in FIGS. 2 and 9 is not limiting and that many variants are possible. For example, in an embodiment, the media request may be sent to the media source at a time later than the sync request (or IDMS request). Furthermore, the media source may start transmitting at any time between the request is sent to the media source and the last data unit associated with the burst is played-out by the receiver.

FIG. 10 is a block diagram illustrating an exemplary data processing system that may be used in systems and methods as described with reference to FIG. 1-9. Data processing system 1000 may include at least one processor 1002 coupled to memory elements 1004 through a system bus 1006. As such, the data processing system may store program code within memory elements 1004. Further, processor 1002 may execute the program code accessed from memory elements 1004 via system bus 1006. In one aspect, data processing system may be implemented as a computer that is suitable for storing and/or executing program code. It should be appreciated, however, that data processing system 1000 may be implemented in the form of any system including a processor and memory that is capable of performing the functions described within this specification.

Memory elements 1004 may include one or more physical memory devices such as, for example, local memory 1008 and one or more bulk storage devices 1010. Local memory may refer to random access memory or other non-persistent memory device(s) generally used during actual execution of the program code. A bulk storage device may be implemented as a hard drive or other persistent data storage device. The processing system 1000 may also include one or more cache memories (not shown) that provide temporary storage of at least some program code in order to reduce the number of times program code must be retrieved from bulk storage device 1010 during execution.

Input/output (I/O) devices depicted as input device 1012 and output device 1014 optionally can be coupled to the data processing system. Examples of an input device may include, but are not limited to, for example, a keyboard, a pointing device such as a mouse, or the like. Examples of an output device may include, but are not limited to, for example, a monitor or display, speakers, or the like. Input device and/or output device may be coupled to data processing system either directly or through intervening I/O controllers. A network adapter 1016 may also be coupled to data processing system to enable it to become coupled to other systems, computer systems, remote network devices, and/or remote storage devices through intervening private or public networks. The network adapter may comprise a data receiver for receiving data that is transmitted by said systems, devices and/or networks to said data and a data transmitter for transmitting data to said systems, devices and/or networks. Modems, cable modems, and Ethernet cards are examples of different types of network adapter that may be used with data processing system 1050.

As pictured in FIG. 10, memory elements 1004 may store an application 1018. It should be appreciated that data processing system 1000 may further execute an operating system (not shown) that can facilitate execution of the application. An application, being implemented in the form of executable program code, can be executed by data processing system 1000, e.g., by processor 1002. Responsive to executing application, data processing system may be configured to perform one or more operations to be described herein in further detail.

In one aspect, for example, data processing system 1000 may represent a client data processing system, such as a receiver or client device for use in a receiver. In that case, application 1018 may represent a client application that, when executed, configures data processing system 1000 to perform the various functions described herein with reference to a "client". Examples of a client data processing system can include, but are not limited to, a personal computer, a portable computer, a mobile phone, or the like.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

It is to be understood that any feature described in relation to any one embodiment may be used alone, or in combination with other features described, and may also be used in combination with one or more features of any other of the embodiments, or any combination of any other of the embodiments. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. The invention is not limited to the embodiments described above, which may be varied within the scope of the accompanying claims.

The invention claimed is:

1. Method for enabling synchronization of data processing by a first and second receiver comprising:
    said first receiver processing data units of a first broadcast stream, a play-out delay $\Delta t_p$ defining a time interval between transmission of a data unit of said first broadcast stream to said first receiver and the processing of said data unit by said first receiver;
    initiating transmission of data units of a second broadcast stream to said second receiver, a common timeline correlating one or more data units of said first broadcast stream with one or more corresponding data units of said second broadcast stream;
    selecting for transmission to said second receiver separate from said second broadcast stream, one or more data units from a plurality of stored data units corresponding to data units of said second broadcast stream, wherein at least part of said one or more selected data units have corresponding data units of said first broadcast stream that have been transmitted to said first receiver but that have not yet been processed by said first receiver due to said play-out delay; and
    transmitting at least one of said one or more selected data units to said second receiver before said corresponding data units of said first broadcast stream have been processed by said first receiver;
    wherein said transmitting is started with a selected data unit that has no processing dependency on one or more data units preceding in processing order said selected data unit.

2. Method according to claim 1 comprising:
    terminating said transmitting of said at least one of said one or more selected data units when said second receiver has received one or more data units of said second broadcast stream.

3. Method according to claim 1 further comprising:
    providing said second receiver with a processing point of said first receiver;
    said second receiver using said processing point for processing at least one of said one or more transmitted selected data units in synchronization with the processing of a corresponding data unit of said first broadcast stream by said first receiver.

4. Method according to claim 1 further comprising:
    said second receiver using a second processing rate for processing at least one of said one or more transmitted selected data units, wherein said second processing rate is higher than a first processing rate that is used by said first receiver;
    determining if the processing by said second receiver, of said at least one transmitted selected data unit, coincides with the processing of a corresponding data unit of said first stream by said first receiver; and
    said second receiver starting processing subsequent transmitted selected data units, using said first processing rate, if said at least one transmitted selected data unit coincides with the processing of a corresponding data unit.

5. Method according to claim 1, wherein at least one of said one or more selected data units is transmitted at a transmission rate that is higher than the first processing rate at which said first receiver processes data units in said first broadcast stream.

6. Method according to claim 1 wherein an initial data unit $y_i$ defines a first data unit of said second broadcast stream being transmitted to said second receiver, and wherein said selecting comprises:
    selecting a start data unit for starting an unicast transmission to said second receiver, wherein said start data is selected from a sequence of said stored data units, said sequence being determined on the basis of said initial data unit $y_i$ and the N-th data unit $y_{i-N}$ preceding in processing order said initial data unit $y_i$, $N=R_2*(\Delta t_p-\Delta t_R)$ defining the number of data units N that can be unicasted to the second receiver wherein $\Delta t_R$ represents the burst delay; and $R_2$ the transmission rate at which data units are unicasted to said second receiver.

7. Method according to claim 1 comprising:
    a media source initiating said transmitting of data units of a second broadcast stream in response to a request for data units by said second receiver; and, a synchronization server selecting said one or more data units from a plurality of stored data units corresponding to data units of said second broadcast stream.

8. Method according to claim 7 further comprising:
providing said second receiver with a processing point of said first receiver.

9. Method for enabling synchronization of data processing by a first and second receiver comprising:
said first receiver processing data units of a first broadcast stream, a play-out delay $\Delta t_p$ defining a time interval between transmission of a data unit of said first broadcast stream to said first receiver and the processing of said data unit by said first receiver;
initiating transmission of data units of a second broadcast stream to said second receiver, a common timeline correlating one or more data units of said first broadcast stream with one or more corresponding data units of said second broadcast stream;
selecting for transmission to said second receiver separate from said second broadcast stream, one or more data units from a plurality of stored data units corresponding to data units of said second broadcast stream, wherein at least part of said one or more selected data units have corresponding data units of said first broadcast stream that have been transmitted to said first receiver but that have not yet been processed by said first receiver due to said play-out delay;
transmitting at least one of said one or more selected data units to said second receiver before said corresponding data units of said first broadcast stream have been processed by said first receiver;
said second receiver using a second processing rate for processing at least one of said one or more transmitted selected data units, wherein said second processing rate is higher than a first processing rate that is used by said first receiver;
determining if the processing by said second receiver, of said at least one transmitted selected data unit, coincides with the processing of a corresponding data unit of said first stream by said first receiver; and
said second receiver starting processing subsequent transmitted selected data units, using said first processing rate, if said at least one transmitted selected data unit coincides with the processing of a corresponding data unit.

10. Method according to claim 9 comprising:
terminating said transmitting of said at least one of said one or more selected data units when said second receiver has received one or more data units of said second broadcast stream.

11. Method according to claim 9 further comprising:
providing said second receiver with a processing point of said first receiver;
said second receiver using said processing point for processing at least one of said one or more transmitted selected data units in synchronization with the processing of a corresponding data unit of said first broadcast stream by said first receiver.

12. Method according to claim 9, wherein at least one of said one or more selected data units is transmitted at a transmission rate that is higher than the first processing rate at which said first receiver processes data units in said first broadcast stream.

13. Method according to claim 9 wherein an initial data unit $y_i$ defines a first data unit of said second broadcast stream being transmitted to said second receiver, and wherein said selecting comprises:
selecting a start data unit for starting an unicast transmission to said second receiver, wherein said start data is selected from a sequence of said stored data units, said sequence being determined on the basis of said initial data unit $y_i$ and the N-th data unit $y_{i-N}$ preceding in processing order said initial data unit $y_i$, $N=R_2*(\Delta t_p - \Delta t_R)$ defining the number of data units N that can be unicasted to the second receiver wherein $\Delta t_R$ represents the burst delay; and $R_2$ the transmission rate at which data units are unicasted to said second receiver.

14. Method according to claim 9 comprising:
a media source initiating said transmitting of data units of a second broadcast stream in response to a request for data units by said second receiver; and,
a synchronization server selecting said one or more data units from a plurality of stored data units corresponding to data units of said second broadcast stream.

15. Method according to claim 14 further comprising:
providing said second receiver with a processing point of said first receiver.

16. Method for enabling synchronization of data processing by a first and second receiver comprising:
said first receiver processing data units of a first broadcast stream, a play-out delay $\Delta t_p$ defining a time interval between transmission of a data unit of said first broadcast stream to said first receiver and the processing of said data unit by said first receiver;
initiating transmission of data units of a second broadcast stream to said second receiver, a common timeline correlating one or more data units of said first broadcast stream with one or more corresponding data units of said second broadcast stream; and,
selecting for transmission to said second receiver separate from said second broadcast stream, one or more data units from a plurality of stored data units corresponding to data units of said second broadcast stream, wherein at least part of said one or more selected data units have corresponding data units of said first broadcast stream that have been transmitted to said first receiver but that have not yet been processed by said first receiver due to said play-out delay;
wherein an initial data unit $y_i$ defines a first data unit of said second broadcast stream being transmitted to said second receiver, and wherein said selecting comprises:
selecting a start data unit for starting an unicast transmission to said second receiver, wherein said start data is selected from a sequence of said stored data units, said sequence being determined on the basis of said initial data unit $y_i$ and the N-th data unit $y_{i-N}$ preceding in processing order said initial data unit $y_i$, $N=R_2*(\Delta t_p - \Delta t_R)$ defining the number of data units N that can be unicasted to the second receiver wherein $\Delta t_R$ represents the burst delay; and $R_2$ the transmission rate at which data units are unicasted to said second receiver.

17. Method according to claim 16 further comprising:
transmitting at least one of said one or more selected data units to said second receiver before said corresponding data units of said first broadcast stream have been processed by said first receiver.

18. Method according to claim 17 comprising:
terminating said transmitting of said at least one of said one or more selected data units when said second receiver has received one or more data units of said second broadcast stream.

19. Method according to claim 17 further comprising:
providing said second receiver with a processing point of said first receiver;

said second receiver using said processing point for processing at least one of said one or more transmitted selected data units in synchronization with the processing of a corresponding data unit of said first broadcast stream by said first receiver.

20. Method according to claim 17, wherein at least one of said one or more selected data units is transmitted at a transmission rate that is higher than the first processing rate at which said first receiver processes data units in said first broadcast stream.

21. Method according to claim 17 comprising:
a media source initiating said transmitting of data units of a second broadcast stream in response to a request for data units by said second receiver; and,
a synchronization server selecting said one or more data units from a plurality of stored data units corresponding to data units of said second broadcast stream.

22. Method according to claim 21 further comprising:
providing said second receiver with a processing point of said first receiver.

23. Client device for use in a receiver, said client device enabling synchronizing data processing with the data processing of a further receiver; said client device being configured for:
receiving a processing point associated with the processing of a data unit of a first broadcast stream by said further receiver, a play-out delay $\Delta t_p$ defining the time interval between transmission of a data unit of said first broadcast stream and the processing of the same data unit by said further receiver;
receiving one or more unicasted data units corresponding to data units of a second broadcast stream, wherein a common timeline correlates one or more data units of said first broadcast stream with one or more corresponding data units of said second broadcast stream and wherein said one or more unicasted data units correspond to one or more data units of said first broadcast stream that have been transmitted to said first receiver but have not yet been processed by said first receiver due to said play-out delay; and,
using said processing point for processing at least part of said one or more unicasted data units in synchronization with the processing of said one or more corresponding data units of said first broadcast stream by said first receiver;
wherein said client device is further configured for:
using a second processing rate for processing at least one of said one or more transmitted selected data units, wherein said second processing rate is higher than a first processing rate that is used by said first receiver;
determining if the processing of said at least one transmitted selected data unit by said second receiver coincides with the processing of a corresponding data unit of said first stream by said first receiver; and
said second receiver starting processing subsequent transmitted selected data units using said first processing rate, if said at least one transmitted selected data unit coincides with the processing of a corresponding data unit.

24. Client device according to claim 23 wherein said client device is further configured for:
receiving one or more data units of said second broadcast stream;
terminating the processing of said one or more unicasted data units; and,
continuing the processing of data units in synchronization with the processing of data units of said first broadcast stream by said first receiver, on the basis of said one or more data units of said second broadcast stream.

25. Client device according to claim 23 wherein said client device is further configured for:
selecting one or more data units from a plurality of stored data units corresponding to data units of said second broadcast stream, wherein at least part of said selected data units have further corresponding data units of said first broadcast stream that have been transmitted to said first receiver but have not yet been processed by said first receiver due to said play-out delay.

26. A server for enabling synchronization of data processing by a first and second receiver, wherein said server is configured for:
providing a plurality of data units corresponding to data units of a second broadcast stream in a memory or on a storage medium;
selecting for transmission to said second receiver separate from said second broadcast stream, one or more data units from a plurality of said stored data units, wherein a common timeline correlates one or more data units of said second broadcast stream with one or more corresponding data units of a first broadcast stream, and wherein said one or more selected data units correspond to one or more data units of said first broadcast stream that have been transmitted to said first receiver but have not yet been processed by said first receiver due to said play-out delay;
transmitting at least one of said one or more selected data units to said second receiver before at least one of said one or more corresponding data units of said first broadcast stream have been processed by said first receiver;
wherein said transmitting is started with a selected data unit that has no processing dependency on one or more data units preceding in processing order said selected data unit.

27. A non-transitory computer readable medium comprising software code portions configured for, when run in the memory of a computer, executing the method steps according to claim 1.

28. A non-transitory computer readable medium comprising software code portions configured for, when run in the memory of a computer, executing the method steps according to claim 9.

29. A non-transitory computer readable medium comprising software code portions configured for, when run in the memory of a computer, executing the method steps according to claim 16.

* * * * *